(12) United States Patent
Chung

(10) Patent No.: US 11,778,297 B1
(45) Date of Patent: Oct. 3, 2023

(54) PORTABLE STEREOSCOPIC IMAGE CAPTURING CAMERA AND SYSTEM

(71) Applicant: Hyunin Chung, Seoul (KR)

(72) Inventor: Hyunin Chung, Seoul (KR)

(73) Assignee: Hyunin Chung, Seoul (KR)

( * ) Notice: Subject to any disclaimer, the term of this patent is extended or adjusted under 35 U.S.C. 154(b) by 0 days.

(21) Appl. No.: 18/183,366

(22) Filed: Mar. 14, 2023

(30) Foreign Application Priority Data

Mar. 14, 2022 (KR) .......................... 10-2022-0031386

(51) Int. Cl.
*H04N 23/55* (2023.01)
*H04N 23/54* (2023.01)
*H04N 23/51* (2023.01)
*H04N 13/204* (2018.01)

(52) U.S. Cl.
CPC ........... *H04N 23/55* (2023.01); *H04N 13/204* (2018.05); *H04N 23/51* (2023.01); *H04N 23/54* (2023.01)

(58) Field of Classification Search
CPC ...... H04N 23/55; H04N 13/204; H04N 23/51; H04N 23/54
See application file for complete search history.

(56) References Cited

U.S. PATENT DOCUMENTS

| 9,329,689 | B2* | 5/2016 | Osterhout | ................ | G06F 3/012 |
| 2007/0182812 | A1* | 8/2007 | Ritchey | ................ | H04N 23/698 |
| | | | | | 348/36 |
| 2014/0035959 | A1* | 2/2014 | Lapstun | .................... | G02F 1/33 |
| | | | | | 359/200.7 |
| 2015/0109484 | A1* | 4/2015 | Laroia | .................... | H04N 5/265 |
| | | | | | 348/240.3 |
| 2016/0165111 | A1* | 6/2016 | Uemura | .................... | G02B 7/08 |
| | | | | | 348/208.11 |
| 2016/0255327 | A1* | 9/2016 | Cole | .................... | H04N 13/239 |
| | | | | | 348/43 |
| 2019/0246016 | A1* | 8/2019 | Chang | ................ | G02B 13/0045 |

FOREIGN PATENT DOCUMENTS

| KR | 1020060030208 A | 4/2006 |
| KR | 10-2014-0068214 A | 6/2014 |
| KR | 10-2015-0078315 A | 6/2015 |
| KR | 10-2017-0147685 A | 11/2017 |
| KR | 10-2019-0051740 A | 5/2019 |
| KR | 1020220000667 A | 1/2022 |
| KR | 1020220029613 A | 3/2022 |

* cited by examiner

*Primary Examiner* — Amy R Hsu

(74) *Attorney, Agent, or Firm* — NKL LAW; Jae Youn Kim

(57) ABSTRACT

A portable stereoscopic image capturing camera of the present invention comprises: a case including an opening; a plurality of lenses disposed in a line at a first interval within the case; and a driving module for rotating each of the lenses, wherein the driving module includes a rotating body combined with the lens to rotate the lens, and rotates each of the lenses toward a subject to form a projection intersection point.

12 Claims, 17 Drawing Sheets

PORTABLE STEREOSCOPIC IMAGE CAPTURING CAMERA AND SYSTEM

BACKGROUND OF THE INVENTION

Field of the Invention

The present invention relates to a stereoscopic image capturing camera and a stereoscopic image capturing system, and relates to an efficient method for capturing and producing stereoscopic images using a 'lenticular' or 'parallax barrier' method.

Background of the Related Art

A method of observing stereoscopic images without wearing glasses or a VR headset is called a glasses-free stereoscopic method. In order to develop the glasses-free stereoscopic method for commercial purpose in this way, first, the most efficient stereoscopic method should be selected, and second, application of an efficient method of capturing and displaying stereoscopic images should be considered.

A 'lenticular' method, a 'hologram' method, and an 'integral photography' method are representative stereoscopic expression methods of the glasses-free stereoscopic method.

In particular, since production of a stereoscopic video requires a '3D video editing work' after capturing multi-view (multi-angle) images, the 'lenticular method' may be selected as the most widely used method from the aspect of efficiency.

The lenticular method is a method that displays images using a lenticular lens array sheet (plate), and this is a generalized technique, and since the 'parallax barrier method' is a derived technique that also has a similar principle, detailed description thereof will be omitted.

However, the prior art for capturing stereoscopic images uses a method of capturing images mainly using expensive cameras or broadcasting equipment, and as professional devices are required, there is an economical problem for general people to use, and professional skills are also required.

In addition, 'stereoscopic image capturing assistant devices' for capturing stereoscopic images have been developed in the prior art, and they also have been developed to be able to arrange and mount multiple cameras to be used as a 'rig' for multi-view shooting or a 'multi-view stereoscopic image capturing device'. However, since these devices are too complicated and require professional skills for operation and setting, it is very difficult for general people to use.

(Patent Document 0001) 1. Korean Patent Application No. 10-2017-0147685 Multi 3D stereoscopic image capturing device (Patent Document 0001) 2. Korean Patent Application No. 10-2014-0068214 Rig for multi-view shooting (Patent Document 0001) 2. Korean Patent Application No. 10-2015-0078315 Camera rig device for multi-view shooting and image processing method applying the same

SUMMARY OF THE INVENTION

Since the present invention is not a method of observing stereoscopic images while wearing glasses, i.e., not a 'dual camera image capturing method', it is essential to capture multi-view videos using three or more cameras. Therefore, a method of capturing stereoscopic images using a 'lenticular' or 'parallax barrier' method in the prior art is as follows.

The prior art relates to a method of capturing images using a 'multi-camera set' in which multiple cameras for capturing images are prepared and installed. As a result, there is a problem in that the cameras should be handled and set individually.

Particularly, since it needs to satisfy the capturing conditions and uniformly set the capturing directions and distances for the cameras, there is a problem in that a separate setting device is required to handle the cameras.

Therefore, professional skills are required to handle these devices, and since a very detailed and prompt handling method is required, there is a problem that it is difficult for general people to approach.

In addition, such a multi-camera has a problem in that it is very difficult to adopt a method of capturing images while moving like a video camera since the volume of the set inevitably increases as multiple cameras should be installed.

Therefore, it is unable to prepare a lot of cameras (ten or more) for multi-view shooting without a plan. It is since that the cost and the process of converting a large amount of stereoscopic images, which requires to process as much data as the number of cameras, are a big problem.

A portable stereoscopic image capturing camera according to an embodiment of the present invention comprises: a case including an opening; a plurality of lenses disposed in a line at a first interval within the case; and a driving module for rotating each of the lenses, wherein the driving module includes a rotating body combined with the lens to rotate the lens, and may rotate each of the lenses toward a subject to form a projection intersection point.

The case may include an upper case having an opening, a lower case in which a display is disposed, and a substrate on which the plurality of lenses is disposed.

The portable stereoscopic image capturing camera may include a distance sensor disposed on the substrate at the center of an array where the plurality of lenses is disposed to detect a distance to the subject.

The rotating body may include at least one among a motor, a voice coil motor (VCM), an encoder, and a piezoelectric motor.

The driving module may include a power body for adjusting the first distance.

The rotation angle of the lens may satisfy the following equation. <Equation>$\theta=[\arctan(X/f)]*180/\pi$ (In the above equation, $\theta$ denotes the rotation angle of the lens, X denotes a distance to the lens from a second reference line extended from the center position of the plurality of lenses toward the subject, and f denotes a distance from the projection intersection point to a first reference line connecting the plurality of lenses while the plurality of lenses is aligned in the forward direction.)

A stereoscopic image capturing system according to an embodiment of the present invention may comprise: a control module for interlacing an image input from a portable stereoscopic image capturing camera; a display layer on which the interlaced image is arranged; a transparent thick layer disposed on one side of the display layer; and a lenticular lens array disposed on one side of the transparent thick layer and including a lens array having a plurality of micro lenses, wherein the control module repeatedly arranges a set of captured images, in which the images captured by the plurality of lenses are sequentially arranged, on the display layer, and each set of the captured images includes an alpha image disposed on at least one of both ends.

The alpha image may be one among a monochromatic image, a color image, a gradation image, an image captured by a lens disposed at one end among the plurality of lenses, and an image captured by a lens disposed at the other end among the plurality of lenses.

The control module may arrange the captured image set to match the micro lenses of the lenticular lens array.

A stereoscopic image capturing system according to an embodiment of the present invention comprises: a control module for interlacing an image input from a portable stereoscopic image capturing camera; a display layer on which the interlaced image is arranged; a transparent thick layer disposed on one side of the display layer; and a parallax barrier film disposed on one side of the transparent thick layer and including a mask part that blocks light and a slit part that transmits light, wherein the control module repeatedly arranges a set of captured images, in which the images captured by the plurality of lenses are sequentially arranged, on the display layer, and each set of the captured images includes an alpha image disposed on at least one of both ends.

The alpha image may be one among a monochromatic image, a color image, a gradation image, an image captured by a lens disposed at one end among the plurality of lenses, and an image captured by a lens disposed at the other end among the plurality of lenses.

The control module may arrange the captured image set to match the slits of the parallax barrier film.

The present invention solves the problems of the prior art, and provides a miniaturized and lightweighted stereoscopic image capturing camera, and since stereoscopic image capturing is possible by simultaneously controlling micro lenses installed in one camera, there is an advantage in that the problem of the conventional method of adjusting the shooting conditions by handling a plurality of cameras one by one is solved, and a separate setting device or an operation method of the setting device is not required.

In addition, it is possible to capture images while moving quickly owing to the miniaturized camera, and it not a special device operated by experts to capture images, but has an advantage as a product that can be mass-produced, with which ordinary people may capture images.

DETAILED DESCRIPTION OF THE PREFERRED EMBODIMENT

Figure 1:
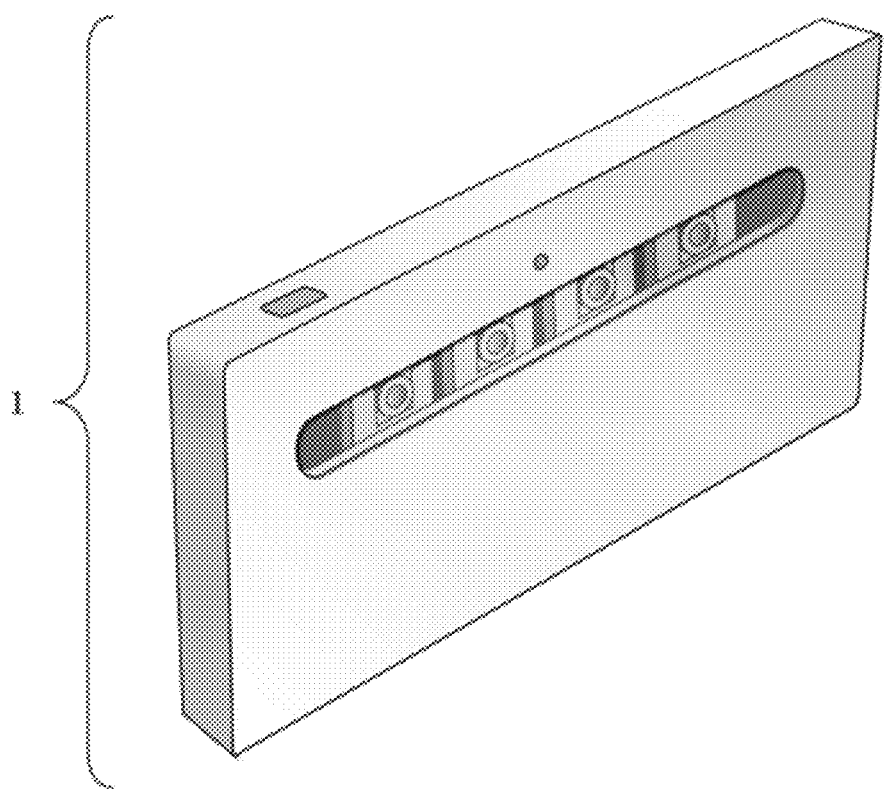
FIG. 1 is a perspective view showing a portable stereoscopic image capturing camera according to an embodiment of the present invention.

A method of observing stereoscopic images without wearing glasses or a VR headset is called a glasses-free stereoscopic method. In order to develop the glasses-free stereoscopic method for commercial purpose in this way, first, the most efficient stereoscopic method should be selected, and second, application of an efficient method of capturing and displaying stereoscopic images should be considered.

A 'lenticular' method, a 'hologram' method, and an 'integral photography' method are representative stereoscopic expression methods of the glasses-free stereoscopic method.

In particular, since production of a stereoscopic video requires a '3D video editing work' after capturing multi-view (multi-angle) images, the 'lenticular method' may be selected as the most widely used method from the aspect of efficiency.

The lenticular method is a method that displays images using a lenticular lens array sheet (plate), and this is a generalized technique, and since the 'parallax barrier method' is a derived technique that also has a similar principle, detailed description thereof will be omitted.

However, the prior art for capturing stereoscopic images uses a method of capturing images mainly using expensive cameras or broadcasting equipment, and as professional devices are required, there is an economical problem for general people to use, and professional skills are also required.

In addition, 'stereoscopic image capturing assistant devices' for capturing stereoscopic images have been developed in the prior art, and they also have been developed to be able to arrange and mount multiple cameras to be used as a 'rig' for multi-view shooting or a 'multi-view stereoscopic image capturing device'. However, since these devices are too complicated and require professional skills for operation and setting, it is very difficult for general people to use.

Meanwhile, although a game company and a cellular phone manufacturer have developed recently a technique of capturing images using a dual lens and seeing 'stereoscopic images', it has not been developed commercially any more as the 'width of the observation angle of view' capable of recognizing stereoscopic images is too narrow by the nature of a dual camera.

Therefore, since it is desirable to use three or more cameras in order to stably secure the observation angle of view, it should be able to handle the multi-camera easily and conveniently.

Therefore, in the present invention, the stereoscopic image capturing camera is manufactured using a micro lens embedded in a cellular phone, a lens for an image capturing camera, or the like, and as the lens quality of a micro camera has been improved recently, the functionality and efficiency of the stereoscopic camera of the present invention can be improved.

A small lens module is one of core IT parts adopted in a cellular phone, tablet PC, notebook computer, web camera, dashboard camera, game console, or the like and used for various purposes such as motion recognition and the like, as well as acquisition of images and videos. Accordingly, in the present invention, stereoscopic images can be easily produced using a 'multi-view stereoscopic image capturing camera' that can be easily accessed by general people owing to the minimum size and adjustment method.

Hereinafter, it will be described in detail with reference to the drawings.

FIGS. 1 to 6 explains the method on the basis of a structure of a stereoscopic image capturing camera manufactured according to an embodiment of the present invention.

FIG. 1 is a view showing that micro lenses are arranged in parallel in the horizontal direction inside one camera to capture images according to an embodiment of the present invention.

Figure 2:
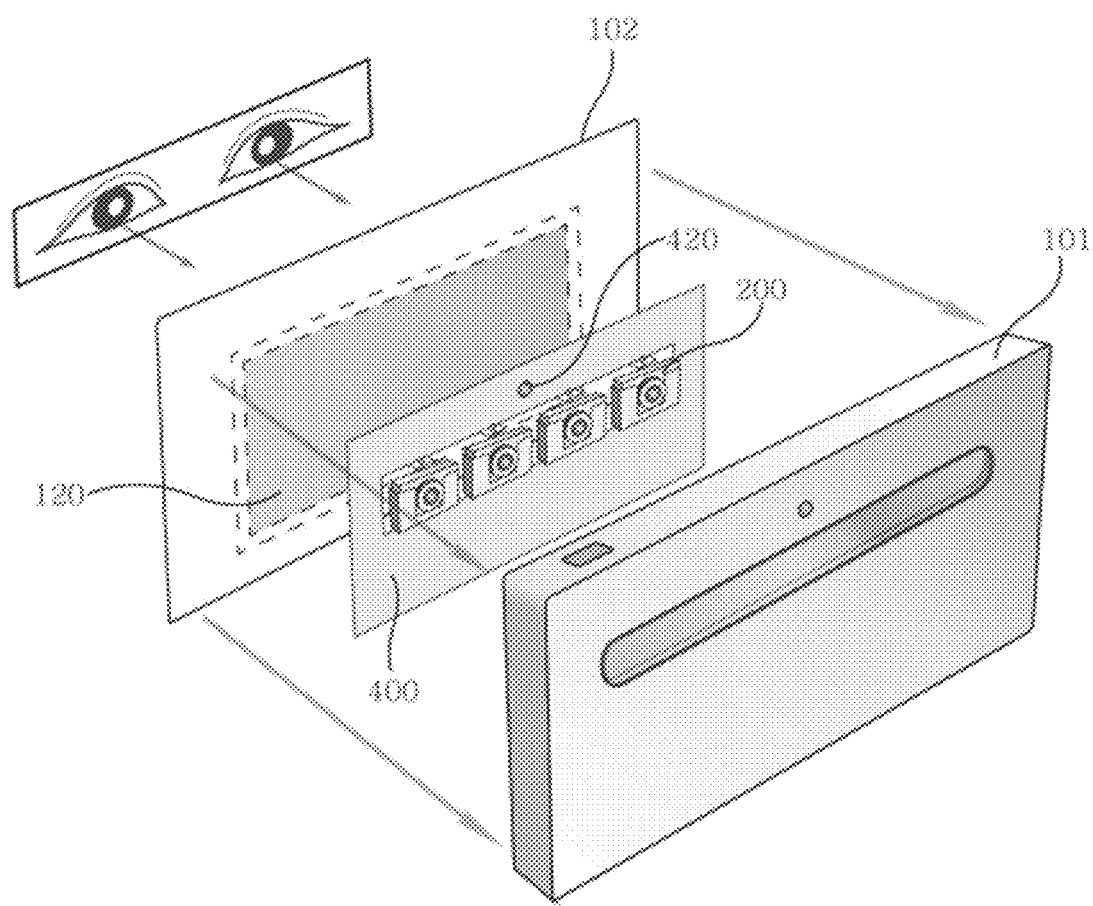
FIG. 2 is an exploded perspective view showing a portable stereoscopic image capturing camera according to an embodiment of the present invention.

FIG. 2 is a view showing a stereoscopic image capturing camera of the present invention, which includes an electronic circuit board 400 configured of an operating system, a sensor, a driving device, a plurality of lenses, and the like, and has a structure of combining a rear side case 102 having a display 120 mounted thereon and a front side case 101.

Therefore, it is natural that the stereoscopic image capturing camera of the present invention is controlled by software (control system) and hardware (electrical device, sensor device, lens module, electronic circuit board, and the like) capable of controlling operation and performance for capturing stereoscopic images.

In addition, the circuit board 400 for capturing stereoscopic images may include an arithmetic unit, a storage device, and the like to process image data captured by each lens, and may also include a wired and/or wireless transmission/reception device as a communication device.

In addition, before describing the present invention in detail, first of all, it needs to classify of the terms. Briefly, a 'camera' is configured of a lens (aperture, shutter speed), a photographic exposure device (film), and a handling body, and a 'digital camera' is configured of a lens, an imaging device (CCD or CMOS), and a handling case (memory, storage device, or transmission device).

Therefore, the camera used in the present invention is manufactured to handle (control) multiple lenses 200 within one handling system, and the multiple lenses used therein are 'micro lenses' mainly used for an imaging camera of a cellular phone or an electronic device.

However, instead of using two or three (telephoto, standard, wide angle) lenses having different angles of view like a cellular phone, it is configured of lenses 200 having the same angle of view and performance.

In addition, it will be characterized in that the lenses are manufactured to be connected to a rotating body or a driving device and rotate at a specific angle in a given direction according to the position of the subject.

Therefore, the difference between the present invention and the conventional method and the specific problems will be described first below.

Generally, the purpose of glasses-free stereoscopic image capturing is utilizing the method mainly for movies or advertisement media. However, it is actually used only in some fields since the method is very complicated and expensive for capturing and producing images.

Since the glasses-free stereoscopic image capturing method is a method of arranging (disposing) multiple cameras having excellent performance and capturing images only within the space (radius) of the arranged cameras, it is complicated and has limitation in space utilization and mobile shooting. In addition, the glasses-free stereoscopic image capturing method requires a process of simultaneously shooting a subject from multiple multi-view directions (multi-angle), collecting and editing images captured by the multiple cameras, and creating final stereoscopic image data.

Figure 3:
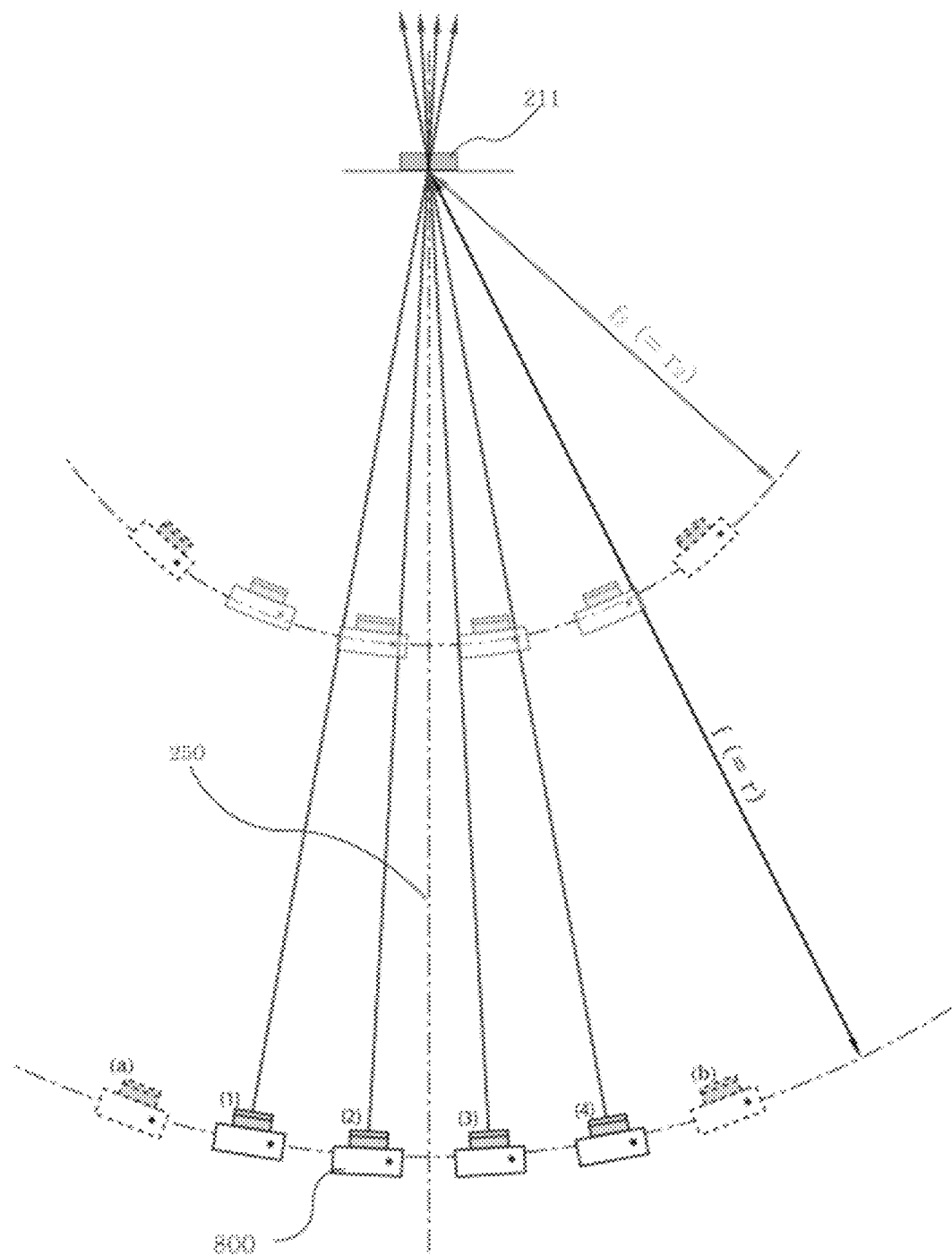
FIG. 3 is a view showing an example of capturing a stereoscopic image by cameras in an arc array according to the prior art.

FIG. 3 is a view showing that a camera array for capturing stereoscopic images of a conventional method is formed in an arc shape.

As shown in FIG. 3, in the conventional method, all the cameras 800 are arranged to face the subject, and since the distance f between the cameras and the subject 211 should be constant, it is a method of capturing images while maintaining a constant interval in an arc (semicircle) shape.

However, the problem is that although the shooting direction of each camera is set toward the focusing point (subject), the focusing point r2 needs to be continuously changed from the distance f to the original arc array to the distance f2 to an arc array at a nearby place when the subject 211 moves, and actually, it is very troublesome to instantly align and handle a plurality of cameras 800 placed in an arc array and acts as a factor that hinders prompt shooting.

In addition, in another prior art, there is a method of manufacturing and using a device 'rig' capable of arranging cameras, and the rig is a device for assembling multiple cameras at regular intervals in an arc or horizontal array. This device is also designed to manually handle the cameras to face the subject considering the orientation, interval, and distance to the subject. However, since the cameras should be arranged to adjust the shooting direction toward the focusing point (subject), this method also has a problem in that each camera should be individually adjusted whenever the distance to the subject changes.

In addition, as another problem of the conventional method, there is a problem in that images captured by each camera should be individually checked and handled one by one.

'Multi-view stereoscopic image capturing' is basically a method of producing a video stereoscopic screen by performing a stereoscopic (interlacing) editing process on the images captured and collected by multiple cameras, and since the images are captured by multiple cameras, the starting points of the captured images, i.e., the timelines, are inevitably different from each other, the calibration values of the images captured by the cameras are also different, and the exposure values of light, i.e., a surrounding environmental factor, are also different, so that the method for editing the images into a stereoscopic image is very complicated and inconvenient.

It is very complicated and time-consuming to set up the cameras before capturing stereoscopic images, and since a complicated step of checking the captured images one by one should be performed to correct the images even after capturing the images, this is a serious problem.

In addition, in the multi-view shooting for stereoscopic images, although the timeline for fixing the movement of the subject should be consistent when editing the video, there is a problem in that switches of the cameras should be pressed at the same time since the images should be captured by using multiple cameras in multi-view directions, and since the reaction speed to a start signal inevitably varies, there is a problem in that when the operation speed is unsynchronized even by 0.1 second, it acts as a factor that hinders the stereoscopic effect due to the difference in the visions perceived by two eyes.

Therefore, the present invention will be described together with the drawings illustrated below as a method for solving problems of the prior art.

Since the stereoscopic camera of the present invention is a method for controlling and using multiple 'micro lenses' arranged in one camera, the problems generated by the conventional handling method and stereoscopic image production can be solved.

Figure 4:
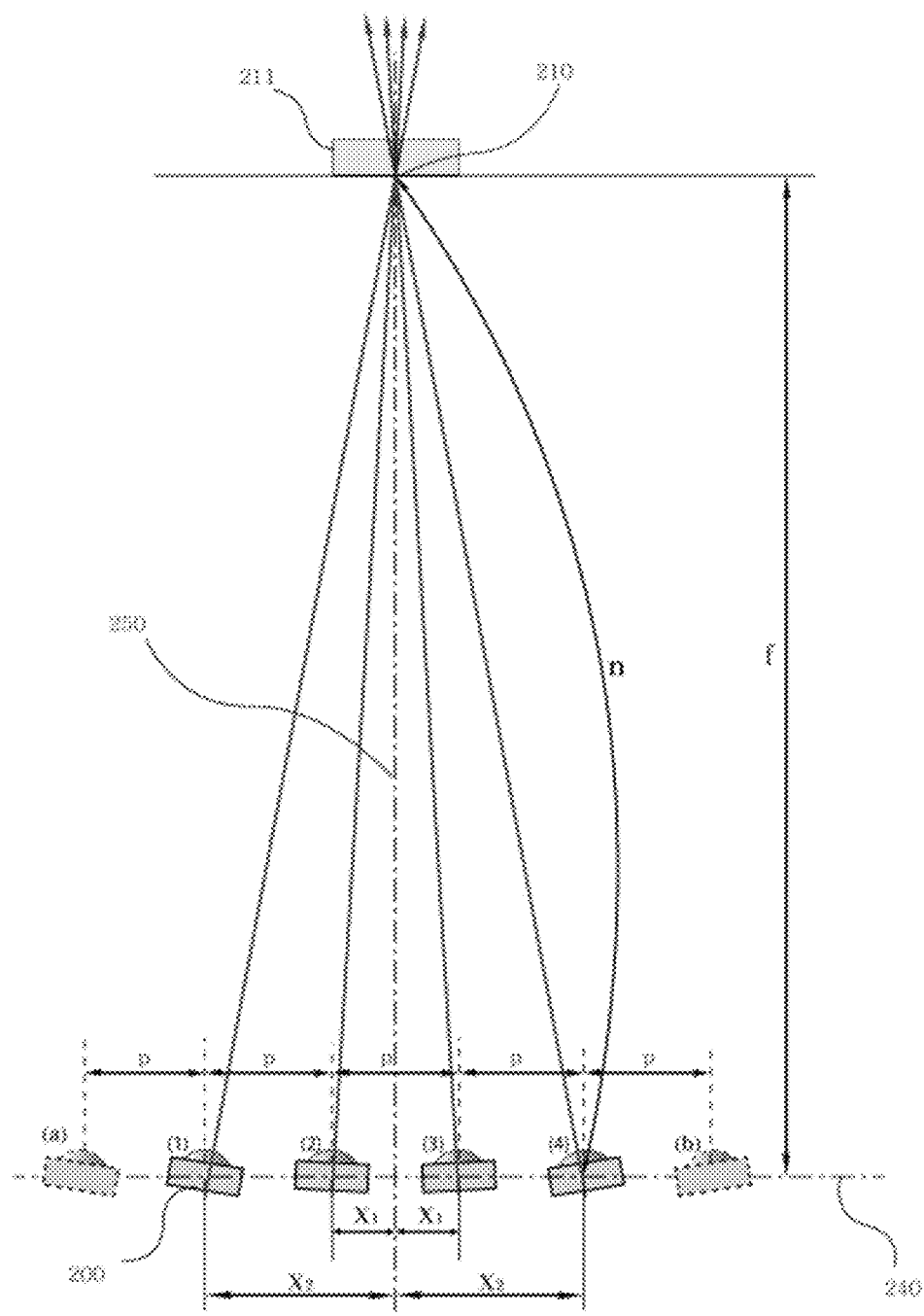
FIG. 4 is a view showing an example of micro lenses arranged horizontally according to an embodiment of the present invention.

FIG. 4 is a view showing an example of the lenses of the present invention formed in a horizontal array.

Figure 5:
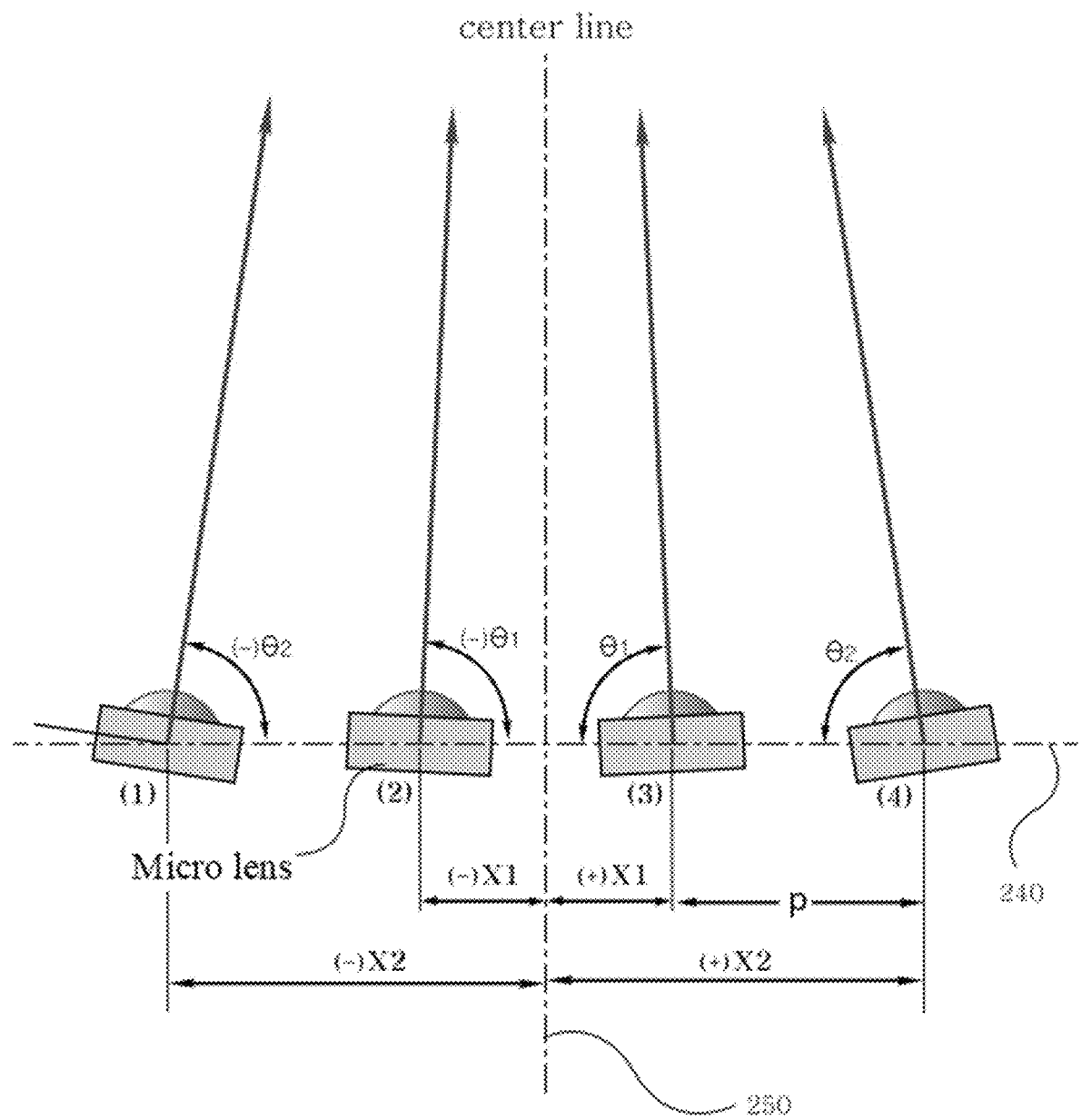
FIG. 5 is an enlarged view showing a method of arranging micro lenses horizontally according to an embodiment of the present invention.
Figure 6:
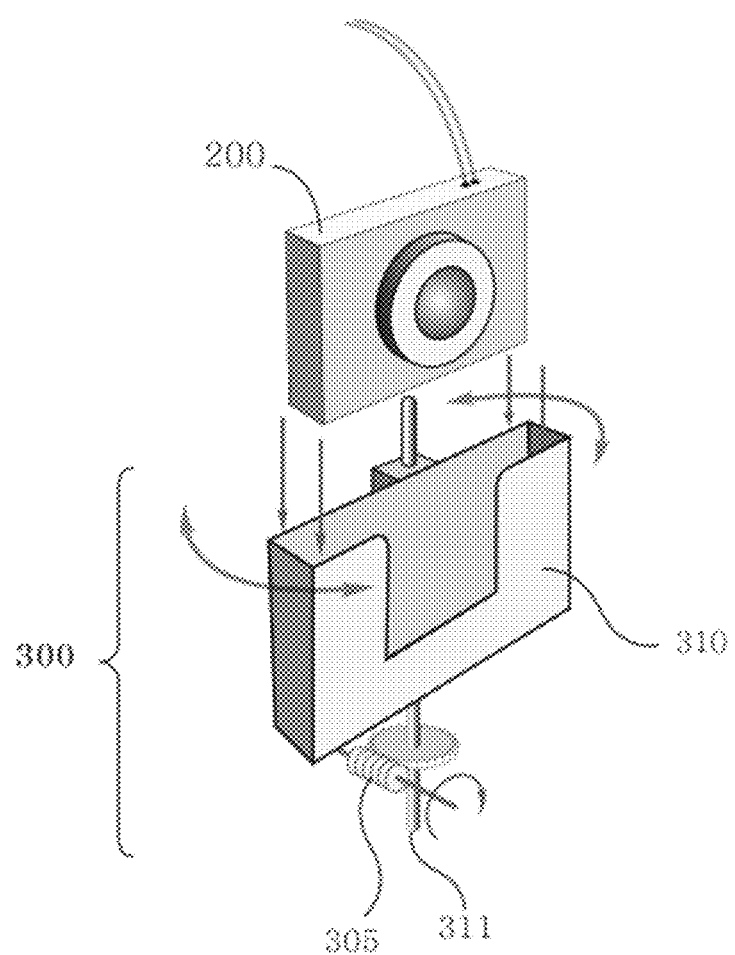
FIG. 6 is a perspective view showing a combination of a micro lens and a rotating body according to an embodiment of the present invention.

FIG. 5 is an enlarged view showing an example of the lenses of the present invention formed in a horizontal array and moving angles of the lenses.

It has been mentioned above that the lenses of the present invention are configured of micro lenses 200. Therefore, since the interval between the arranged lenses is inevitably much smaller than the interval between the cameras 800 of the conventional method, i.e., the interval according to the body size of the arranged cameras, the lenses can be controlled promptly, and although they are formed in a horizontal array rather than an arc array, there is no problem in simultaneous capturing images.

Actually, although the arc array facing a subject located on the front side is an important factor in the arrangement of cameras for 'multi-view stereoscopic image capturing', the difference between the arc array and the horizontal array is that all the cameras obviously have a difference in the distance to the subject, and particularly, in the horizontal array, since the distance of a camera located at an end is greater than the distance of a camera located at the center, there may be a difference in the focus, and although the subject is photographed, the larger the error, the more an unnatural distortion phenomenon occurs when a stereoscopic image is produced since the subject and the surrounding background are shown to be blurry or different in size with respect to the focus.

However, unlike this phenomenon, the present invention will be comparatively described as a horizontal array structure of micro lenses.

When a general camera for video shooting in the conventional method is assumed to have a DSLR size, the size like this requires an array pitch interval of 13 to 15 Cm no matter how small the interval is, and therefore, an arc array of a large interval within the radius of curvature centered on the subject is inevitable.

On the other hand, since the lenses of the present invention have a diameter of 1 Cm or less, the pitch interval between the lenses is a configuration condition of a non-comparable size of 1 to 5 Cm or less, and therefore, although a horizontal array, it does not make a problem generated by an error, unlike the arc array.

Accordingly, a numerical comparison between the errors generated by the arc array and the horizontal array of DSLR cameras and micro lenses is described below.

For the sake of simple comparison, as shown in FIGS. 4 and 5, it is assumed that the lens array interval (p) of the present invention is 5 Cm or less, and four lenses are arranged horizontally at the intervals of 3 Cm.

When it is assumed that the distance f between the micro lenses 200 and the subject 211 or the projection intersection point 210 is about 1 meter (1,000 mm) to 2 meters (2,000 mm), the measurement distance should be the distance to the position of lens 'No. 4', and therefore, the distance should be measured based on the point X2 45 mm away from the center line 250 toward the outside in practice. That is, the distance n from the subject 211 to the end point (lens No. 4) of the horizontal array is measured, and the error of the distance f from the subject 211 to the arc point or the radius r is 0.45 to 0.224 mm.

Therefore, since the error deviation of the focal length (distance to the intersection point) is 0.0445 to 0.0112%, it falls within the error level captured by the lens. In particular, considering the size and interval of the lenses used in a cellular phone, since the interval is only about 1 Cm or less at the minimum, the minimum error range is further reduced to ⅓ level, so that the distance error is negligible as a result.

TABLE 1

| Classification | Shooting method | Reference arrangement interval (p) | Focal length to subject (f) | | Measurement position for installation of four |
|---|---|---|---|---|---|
| | | | 1,000 mm | 2,000 mm | |
| Distance error between arc array and horizontal array | Intervals of DSLR cameras | 130 mm | 18.8 mm | 9.48 mm | 195 mm |
| | Intervals of micro lenses | 30 mm | 0.45 mm | 0.22 mm | 45 mm |
| Comparison of difference | | (−)100 mm | | | (−)150 mm |

Therefore, since multi-view shooting conditions of general 'cameras' and 'micro lenses' vary greatly according to the arrangement interval as shown above in the table, the error range further increases particularly when multi-view shooting is assumed based on an array of four or more cameras or lenses, e.g., an array of ten, rather than four cameras or lenses as described above, and therefore, only the horizontal array of micro lenses of the present invention is possible.

Accordingly, a plurality of lenses disposed in the case may be arranged in a line at a first interval. Here, the first interval may be greater than or equal to 25 mm and less than or equal to 35 mm. It goes without saying that the first interval may be changed according to the size of the case.

Therefore, when mass production and assembly process are taken into account considering generalization of stereoscopic shooting, it is most efficient to rotate (drive) the lenses in one camera toward one point 210 of the subject since both the economic feasibility and functionality should be considered.

Therefore, when the lenses in the horizontal array of the present invention are projected toward the subject and capture images as shown in FIGS. 4 and 5, the point where the projection directions of the lenses intersect with each other is referred to as a 'projection intersection point 210'.

The projection intersection point or the position of the subject is an element that should be frequently adjusted while shooting. The reason is that the user needs to intentionally handle the lenses all at once while shooting according to the movement or change in the position of the subject. That is, it is very inefficient to stop shooting, handle the lenses to adjust the position of the projection intersection point, and then start shooting again. As a result, the shooting should be conducted to make dynamic stereoscopic production possible without discontinuity of video by simultaneously controlling changes of the intersection point according to the intention of the user even in the middle of shooting.

Accordingly, the method of 'adjusting the projection intersection point' of the present invention, i.e., frequently adjusting to control all at once, is an important key factor for stereoscopic shooting, and a method of finding the 'projection intersection point' based on rotation values of the lenses is required.

The diameter of the micro lenses used in the present invention is less than 1 Cm in most cases, and three or more lenses are arranged horizontally. Although ten or more lenses may be arranged to be used for precise multi-view shooting, it may be adjusted according to the intention of the user.

First, when an even number of lenses are arranged in an array, the same number of lenses will be arranged on the left and right sides of the center, and when an odd number of lenses are arranged, it is natural that a lens is provided at the center and the same number of lenses are arranged on the left and right sides in a balanced manner.

Accordingly, as shown in FIGS. 4 and 5, four lenses are configured as a left-right symmetrical array, and the plurality of lenses are spaced apart from each other at regular intervals p on both sides of the center of a virtual 'first reference line 240' connecting the plurality of lenses to be arranged as 'lens No. 1 to lens No. 4' while the plurality of lenses are aligned to face the forward direction.

In addition, it can be seen that the arranged lenses are equally arranged on the left and right sides of the 'second reference line 250', i.e., in the direction perpendicular to the first reference line, at the center position of the arranged lenses to face the subject, and it shows an example in which lens 'a' on the left side of the 'lens No. 1' and lens 'b' on the right side of the 'lens No. 4' may be equally and additionally arranged.

Therefore, since the intervals of all the lenses are symmetrical and equal around the center, the positions of 'lens No. 2' and 'lens No. 3' are '(−)X1' and '(+)X1' at a distance of minus (−) ½ pitch P and at a distance of plus (+) ½ pitch P, and the positions of 'lens No. 1' and 'lens No. 4' are '(−)X2' and '(+)X2' at a distance of '−(½ P+P)' and '+(½ P+P)' to be placed at symmetrical positions.

Accordingly, when the positions of 'lens No. 3', 'lens No. 4', and 'lens b' are determined, the positions of 'lens No. 1', 'lens No. 2', and 'lens a' will be determined symmetrically. As a result, since each of the lens exists at a different position, it is inevitable to have a different rotation value toward the intersection point.

Therefore, since the projection angle θ of each lens is in a trigonometric function relationship according to the intervals p of the lenses, the vertical distance f to the intersection point, and the distance n from the horizontally arranged lenses to the projection intersection point, the rotation angle of each lens can be controlled according to 'Equation 1' shown below.

$$\theta = [\arctan(X/f)] * 180/\pi \quad \text{Equation 1.}$$

Accordingly, the rotation value of each lens is as follows.

Projection angle of lens No. 1: $(-)\theta_2 = (-)[\arctan(x2/f)] * 180/\pi$

Projection angle of lens No. 2: $(-)\theta_1 = (-)[\arctan(x1/f)] * 180/\pi$

Projection angle of lens No. 3: $\theta_1 = [\arctan(x1/f)] * 180/\pi$

Projection angle of lens No. 4: $\theta_2 = [\arctan(x2/f)] * 180/\pi$

Figure 9:
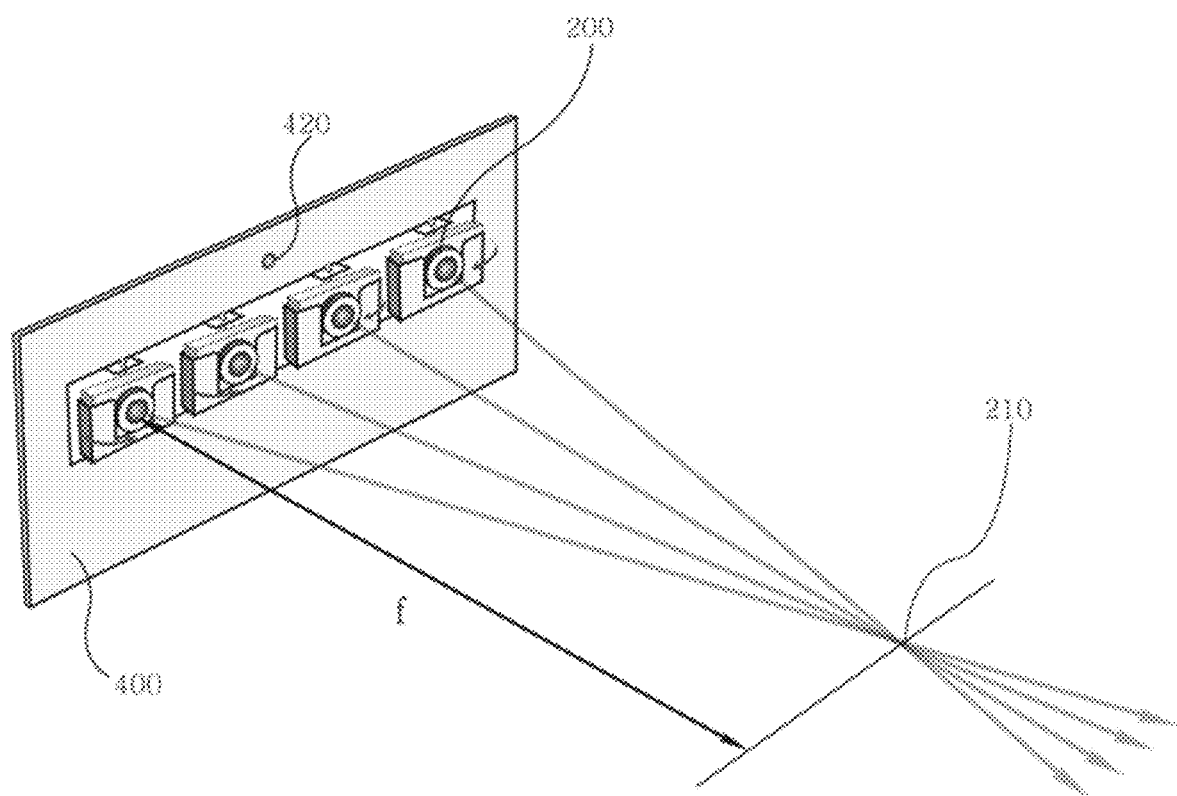
FIG. 9 is a view showing an electronic circuit board into which lenses are inserted according to an embodiment of the present invention.

FIG. 9 is a view for explaining a method of measuring a distance to the projection intersection point according to the position of a subject and a control method thereof in the present invention.

The method of adjusting the lenses toward the projection intersection point may be divided into a 'depth focus first adjustment method' and a 'projection intersection point first adjustment method' according to the intention of the user.

For example, in the 'depth focus first adjustment method', when it is assumed that a subject is positioned two meters ahead f, and any one lens functions as a 'measurement lens' and adjusts the depth focus n of the subject according to the position of the subject, the data value is transmitted to all the other lenses as a signal, and the depth focus n of all the lenses is set equally. In addition, since a digitized distance of the depth focus n makes it possible to know the 'vertical distance to the intersection point' f, the lenses simultaneously rotate toward the 'projection intersection point' according to the value.

Since any one of the lenses is determined as a measurement lens, in the case of a lens array of an odd number, the lens located at the center functions as the 'measurement lens', and in the case of a lens array of an even number, it will be desirable to select a lens among two lenses located in the middle, e.g., among the 'lens No. 2' and 'lens No. 3' in 'FIG. 5', and use it as the 'measurement lens'.

In addition, as another method, as shown in FIG. 9, a 'distance sensor 420' is configured, and this is located at the center of the lens array and detects the distance to the subject so that the lenses may be controlled to face the projection intersection point 210.

The distance sensor 420 includes (1) an ultrasonic sensor: sound wave, (2) an infrared sensor: infrared, (3) a LiDAR sensor: laser, (4) a radar sensor: radio wave, (5) a camera sensor (passive sensor): visible light, and the like, and it can be selected and applied according to the intention of the user. Therefore, the direction of rotation of the lenses toward the 'depth of focus' and the 'projection intersection point' can be collectively controlled according to the measured distance value.

As a result, in a stereoscopic image, objects around the subject are shown three-dimensionally around the subject (projection intersection point), and objects in front of the subject (projection intersection point) appear to be 'projected', and objects behind the subject (projection intersection point) are perceived in a 'sense of depth'. In addition, when the depth focus is continuously adjusted according to the movement of the subject, the continuously changing surrounding environment may produce, together with the subject, a dynamic stereoscopic image.

In addition, the 'projection intersection point first adjustment method' is a case of shooting after the projection intersection point is arbitrarily set to the distance of a specific location in advance by the user, and it is a method of three-dimensionally showing a moving subject according to moving forward and backward when a stereoscopic environment is set around the projection intersection point. That is, it is a method in which a subject looks 'protruding' gradually when the subject moves forward from the projection intersection point, and the subject is produced to have a 'sense of depth' gradually when the subject moves backward from the projection intersection point.

As a result, it is a method of shooting by directing a subject that moves around a given distance to look dynamic and stereoscopic.

FIGS. 6 to 8*b* relate to rotational driving of a micro lens according to the present invention.

First, a driving motor that adjusts the 'depth focus' and a 'lens assembly' having several sheets of lenses overlapped in layers are configured inside the micro lens of the present invention. In addition, the 'driving motor' adjusts the depth focus by adjusting the intervals between the several sheets of lenses. A voice coil motor (VCM), an encoder, a piezoelectric motor, or the like is used as a motor for adjusting the depth focus, and they are mainly used in 'cellular phone' cameras.

In addition, in the case of the 'micro lens' used in the present invention, there also exists an 'infinity focus lens' that does not have a depth focus control function, so that when the 'projection intersection point' is properly formed in the event of capturing stereoscopic images, it does not matter to use an 'infinity focus lens'. However, it is natural that the quality is lowered compared to a lens having a depth focus control function.

In addition, in the present invention using several small lenses 200, each of the lenses rotates as much as a predetermined angle by a 'rotating body module 300' or a rotating body 500 combined with the lens.

Figure 7:
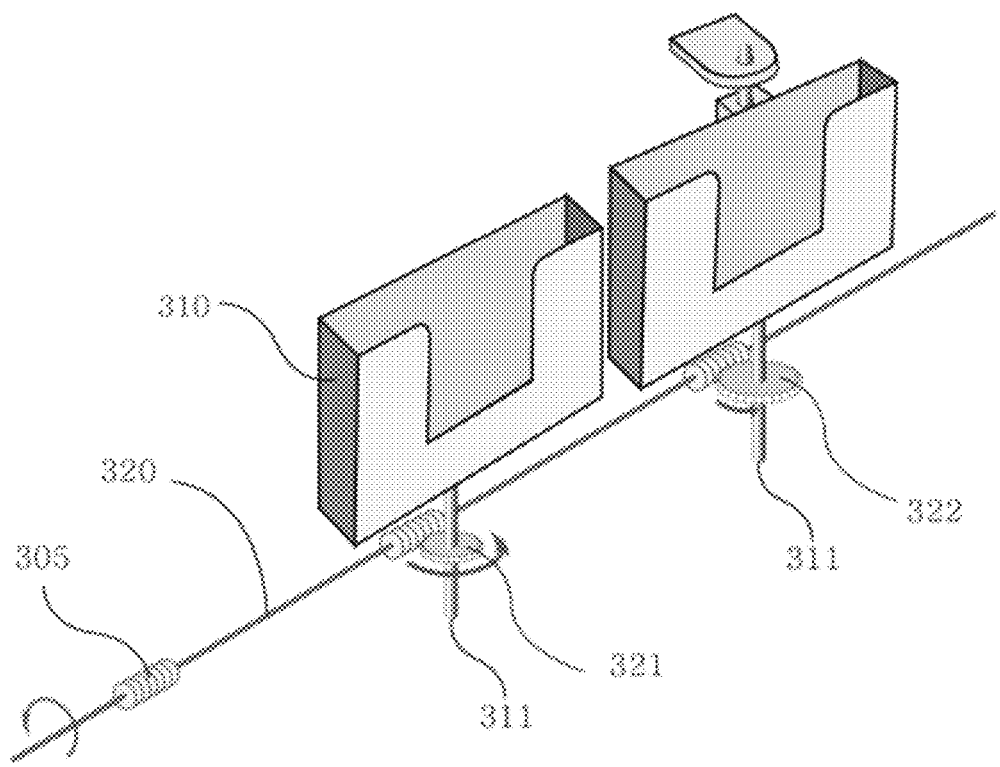
FIG. 7 is a view showing a method of collectively rotating lenses according to an embodiment of the present invention.

In addition, FIG. 7 shows a structure in which each of the lenses may rotate at a predetermined angle by rotation of one motor as is shown according to an embodiment.

Worm gears 305 are inserted at regular intervals in the rotation shaft 320 connected to the motor, and lens holders 310 devised to fix and rotate each of the lenses and gear wheels 321 and 322 inserted in the holder rotation shafts 311 are connected to the worm gears 305. However, it can be seen that the sizes of the gearwheels 321 and 322 are different, and this is since that as the 'gear ratio' is adjusted according to the 'size' or the 'number of teeth' of the gearwheels, the lenses may rotate simultaneously at a specific angle θ.

Figure 8A:
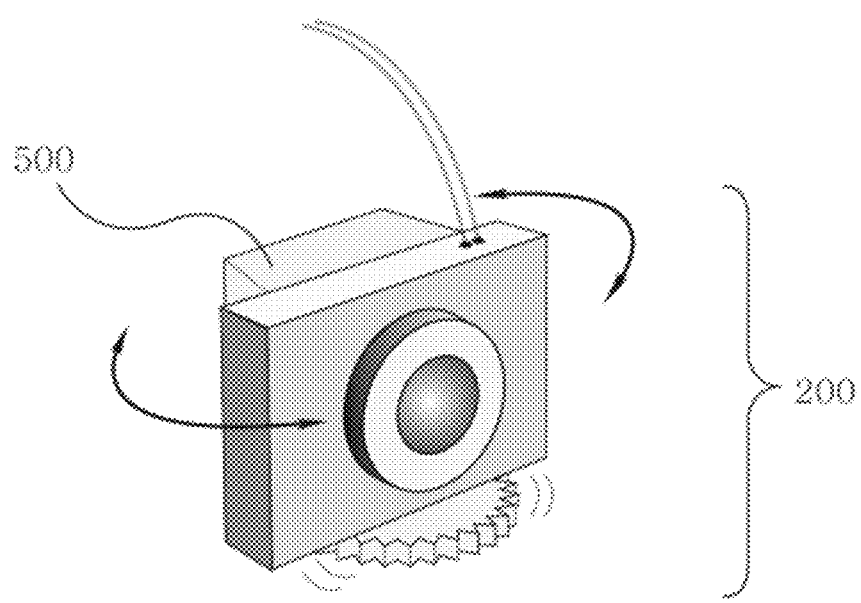
FIG. 8a is a view showing a configuration in which a lens and a rotating body are combined according to an embodiment of the present invention.

However, although a worm gear and a gearwheel may be used since each lens needs to move at a very precise angle less than 0.1 degree, it is preferable to use the rotating body 500 or a small motor that moves each lens as shown in FIG. 8*a*.

The lens 200 according to the embodiment of FIG. 8*a* of the present invention shows an example in which the 'lens' and the 'rotation driving body 500' may be formed in one body 200.

This is a method that may use a voice coil motor (VCM), an encoder, an ultrasonic piezoelectric motor, or the like to control precise rotation, that is, it is a driving body that may rotate or linearly move by ultrasonic or electromagnetic force.

Accordingly, since the 'rotation driving body 500' may be a rotating body surrounding the body of the 'lens' according to selection of the user or a micro rotating body moving inside the lens, the configuration method may vary according to the intention of the user.

Figure 8B:
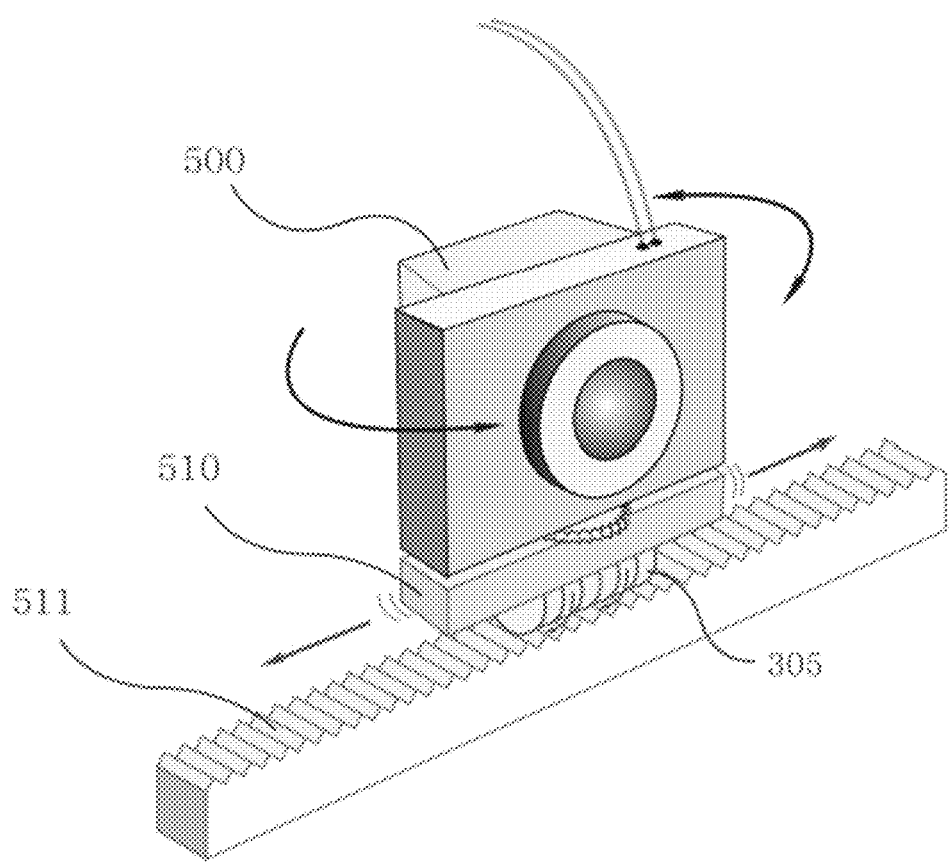
FIG. 8b is a view showing a structure in which a lens, a rotating body, and a linear movement power body are combined according to an embodiment of the present invention.

In addition, FIG. 8*b* shows an example in which a linear movement power body 510 capable of moving horizontally is configured as one module, together with the lens (and the rotating body) described in FIG. 8*a*, to be able to adjust the intervals between the lenses 200.

This is a function for rotating each lens and increasing or decreasing the distance between the lenses at regular intervals. Therefore, this is a method for complementing weakening of the stereoscopic effect that can be sensed with naked eyes in the case of seeing a stereoscopic image captured when the subject or the projection intersection point is located at a distance.

Generally, in the case of a small lens, it does not make a big problem when the distance is about 1 meter since the shooting angle of view is relatively wide. However, a phenomenon that gradually lowers the stereoscopic effect occurs at a distance greater than 1 meter. Since this occurs due to the difference in the projection angle θ of the subject captured by each lens, it can be seen that a subject 210 and 211 at a distance shows a slight change (difference in the angle of view) in the captured image shown on the screen, and a subject 210 and 211 captured at a close distance obviously shows a change (difference in the angle of view). Particularly, this appears further severe in the case of a wide-angle lens, compared to a telephoto lens, and only a weak sense of depth can be perceived from the subject 210 and 211 at a distance, and a rich stereoscopic effect is hardly felt.

Therefore, in this case, the projection angle θ is secured by increasing the intervals X between the lenses to be able to sufficiently feel the stereoscopic effect as much as the increased distance to the projection intersection point f, and as a result, it is possible to shoot a subject to be able to observe a 'sense of depth' and a 'sense of protrusion' even when shooting a subject placed at a distance.

Accordingly, as the linear movement method of the present invention for adjusting the first interval, which is the interval between a plurality of lenses, a 'worm gear' rotation method by a small motor or an 'ultrasonic piezoelectric motor' method that moves based on micro-vibration of frequency can be used.

Accordingly, FIG. 8*b* is a configuration according to an embodiment of the present invention, and it can be seen that the driving body 510 for linear movement is added to the lens 200 according to the embodiment of FIG. 8*a*. The rotating body 500 for rotating the lens mentioned above, the driving body 510 for linear movement of the lens, and the 'lens' are formed in one body.

Accordingly, the worm gear 305 connected to the driving body 510 may be controlled to move on the linear saw teeth 511 while rotating, and when the driving body 510 is configured of an 'ultrasonic piezoelectric motor', it will be natural that linear movement, in addition to more precise control, is possible without the worm gear and linear saw teeth.

Figure 10:
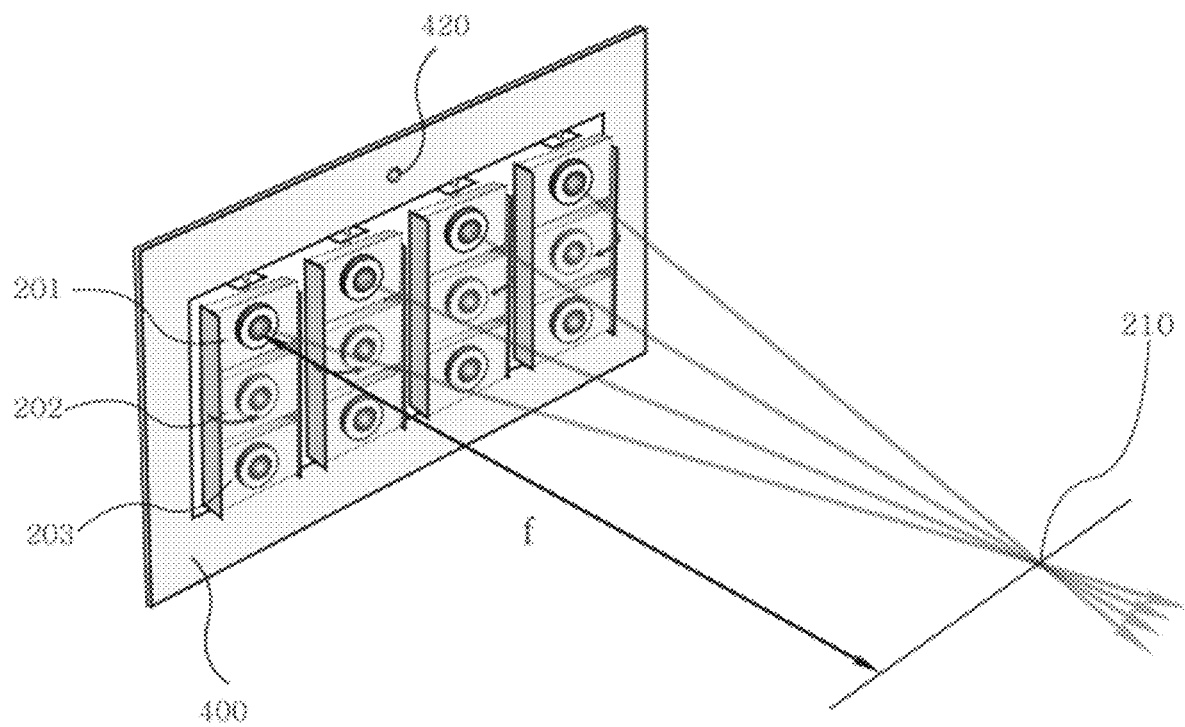
FIG. 10 is a view showing that wide-angle, standard, and telephoto lens modules are mounted according to an embodiment of the present invention.

In addition, as shown in FIG. 10, each of the lenses may be a lens having a zoom function for zooming in and zooming out the screen, and a micro lens has a function of zooming in and zooming out, i.e., a function of a wide-angle lens, a standard lens, or a telephoto lens. The micro lens module may be manufactured by connecting two or three lenses to capture images as a wide-angle lens, a standard lens, and a telephoto lens, respectively.

Accordingly, the lens used in the present invention may be configured of a lens capable of a 'zoom' function, and this is manufactured as one 'zoom lens module' configured of a wide-angle lens 201, a standard lens 202, and a telephoto lens 203, and the 'zoom lens module' may be manufactured to be combined with a rotating body to rotate toward the projection intersection point. This is a function that allows a user to conveniently capture more dynamic stereoscopic images.

Figure 11A:
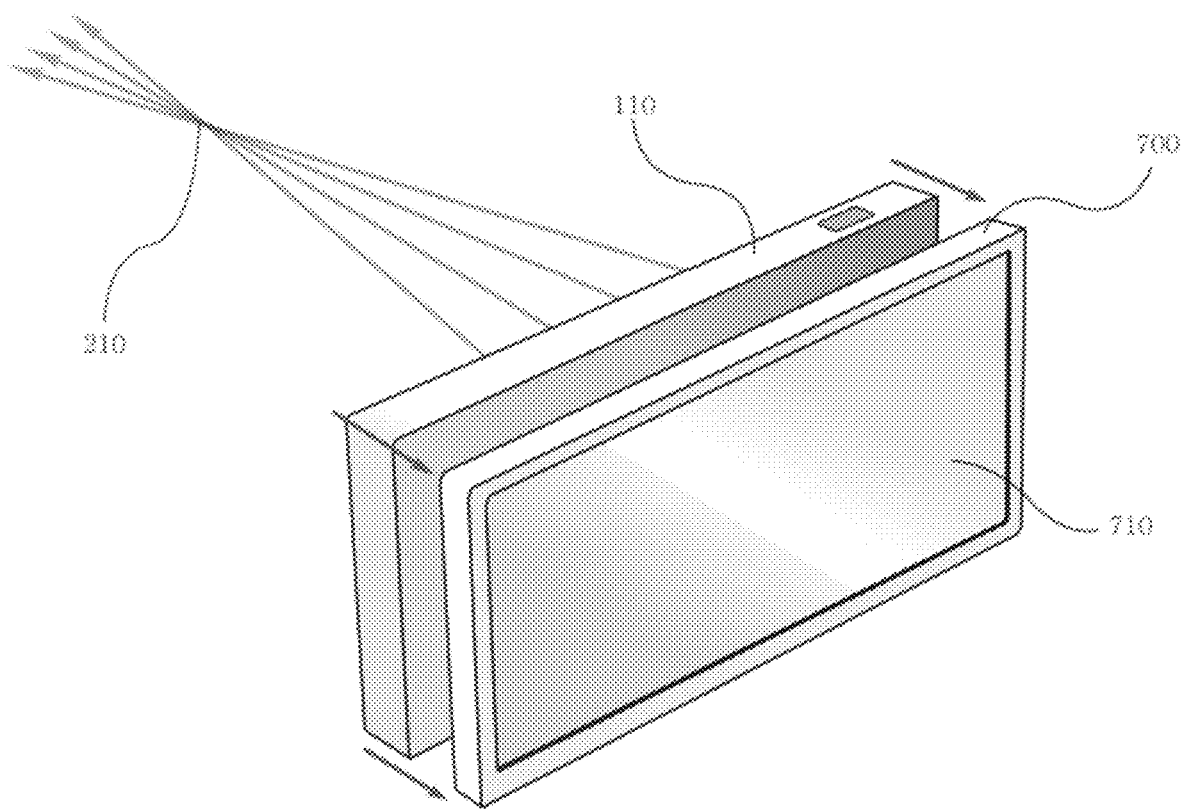
FIG. 11a is a perspective view showing that a stereoscopic image capturing camera is tightly attached to the backside of a cellular phone screen according to an embodiment of the present invention.
Figure 11B:
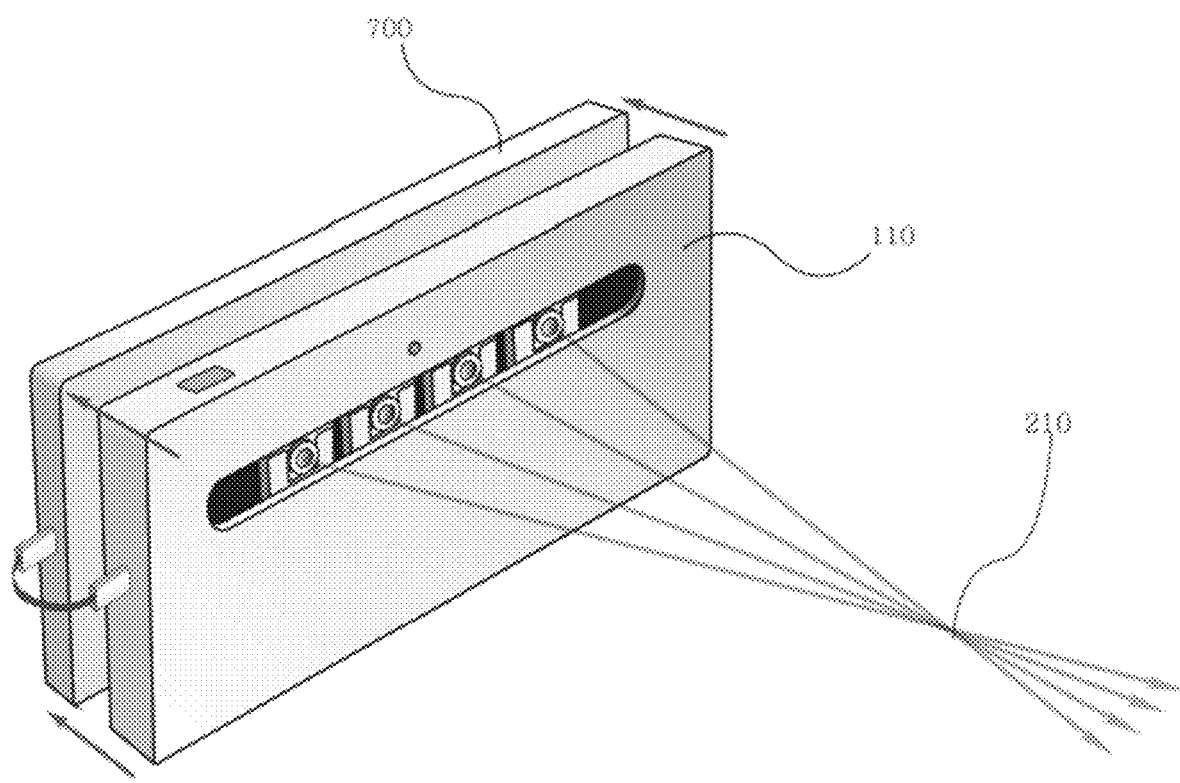
FIG. 11b is a perspective view showing that a cellular phone is tightly attached to the backside of a stereoscopic image capturing camera according to an embodiment of the present invention.

FIGS. 11a and 11b are views showing an embodiment of the present invention, in which a stereoscopic image capturing camera is combined with a cellular phone.

FIG. 11a is a perspective view showing a structure in which a stereoscopic image capturing camera of the present invention is combined and integrated with a cellular phone, which is seen from the display (screen) side of the cellular phone, and FIG. 11b is a perspective view seen from the lens array direction, i.e., an opposite direction, of the stereoscopic image capturing camera.

The stereoscopic image capturing camera and the stereoscopic image capturing system of the present invention can be manufactured in connection with a cellular phone, and it is a method that can save much hardware manufacturing cost since the power supply, display, and arithmetic unit of the cellular phone can be used as they are.

This allows a camera configured of a minimum stereoscopic image capturing device to be connected with a cellular phone through wired or wireless communication, and it can be manufactured using a portable tablet PC device or the like, instead of the cellular phone. Therefore, the conditions and functions for capturing stereoscopic images can be adjusted by executing the software (or a dedicated app) that may handle the camera on the cellular phone, while seeing the cellular phone screen.

In addition, when the arithmetic unit of the cellular phone is utilized, this may function as an innovative method that stores the images (data) captured by the camera in the cellular phone, converts the captured images into stereoscopic images (interlacing), and transmits and views the stereoscopic image data.

Figure 12:
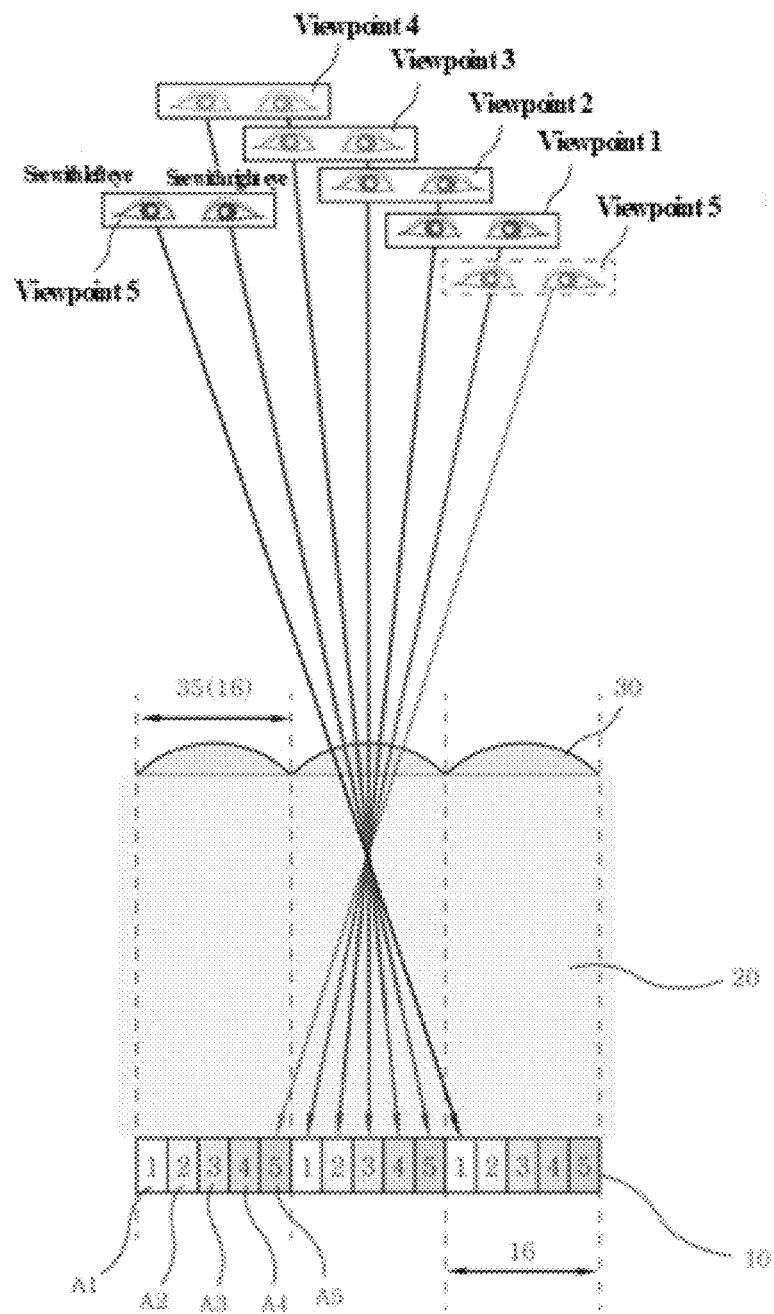
FIG. 12 is a view showing a process of 3D dimensioning and projecting an image on a display in a lenticular method according to the prior art.
Figure 13:
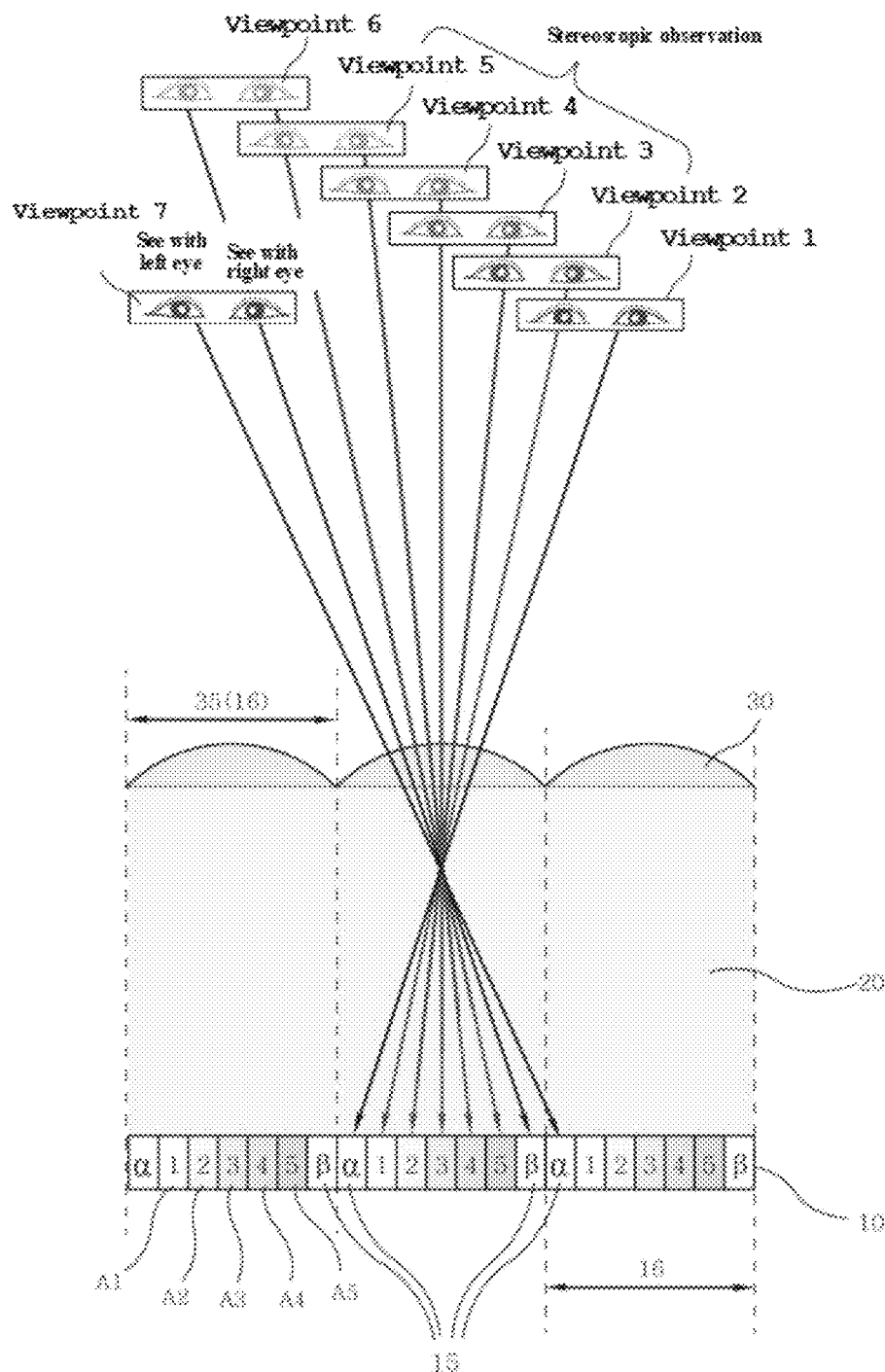
FIG. 13 is a view showing a process of 3D dimensioning and projecting an image on a display according to an embodiment of the present invention.
Figure 14:
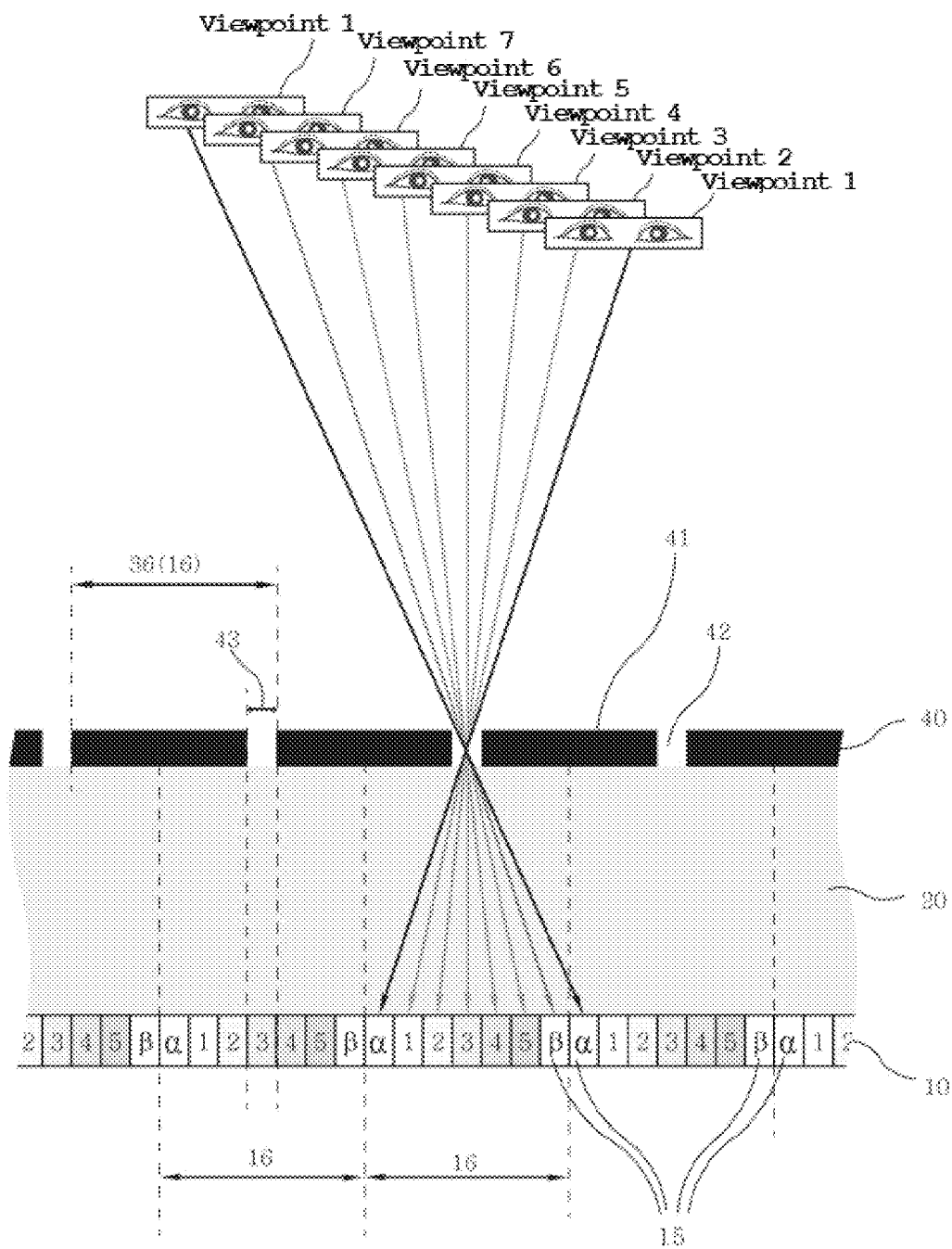
FIG. 14 is a view showing a method of seeing a stereoscopic image through a display and a parallax barrier according to an embodiment of the present invention.

FIGS. 12 to 14 are views showing and explaining the '3D dimensioning (interlacing)' operation of the present invention.

The '3D dimensioning (interlacing)' is generally an essential work for producing a stereoscopic screen, which can be a process of compressing images captured at various angles into a single image, and the process of converting data to be seen three-dimensionally is referred to as a '3D dimensioning' or 'interlacing' work.

Accordingly, the present invention requires a work process for making 'image data' of various angles captured by the lenses into one 'image data', and the result should be visible through the screen. Depending on how many lenses (points of view) are used to capture the image, the processing speed and result values, such as capacity of data compression, stability of stereoscopic perspective angle of view, quality of resolution, and the like, appear differently.

For example, data should be processed and stored or transmitted within the shortest possible time (or immediately), and the capacity of processing data appears to be different according to first, how many multi-view screens will be applied, second, how many types of correction works (timeline, color, brightness, position, angle of view, etc.) will be used, third, how many points of view will be used as a basis for the observer's (perspective) point of view, and fourth, how much sharpness of a stereoscopic observation perception resolution will be maintained in order to perform the interlacing work.

For example, when an image is captured by ten cameras or lenses (10-viewpoint shooting), the ten images are split, classified, combined, and repeatedly arranged within one lenticular valley (lens) pitch, and when this is explained as follows in comparison with a case of applying an image captured by five cameras, and it is based on the assumption that the screen resolution is observed on a 400 lpi display.

Since the display observation resolution of the image captured by 10-viewpoint shooting is based on 400 lpi, it is the same as watching a screen divided into ten captured images on a 400 lpi screen. As a result, ten images of 40 lpi are displayed to be seen according to the perspective angle. This is, as a result, seeing a stereoscopic image configured of a screen having a resolution of 40 lines (40 lpi) with eyes.

In addition, since 5-viewpoint shooting is 400/5=80 lpi, a stereoscopic image expressed as 80 lines per inch (80 lpi) is perceived with eyes. Accordingly, comparing in detail, although the original resolution of the display screen is 400 lpi and the thickness of one line is 0.0635 mm, as the resolution of the screen for viewing with ten viewpoints is 40 lpi, it has a result the same as seeing a screen configured of pixels with a thickness of 0.635 mm, and as the screen for viewing with five viewpoints is 80 lpi, it is seeing a screen configured of pixels having a thickness of 0.3175 mm.

A problem occurs hereinafter. That is, it is desirable to express the pixel size of a natural video perceived by a person with eyes within at least about 0.35 mm although it varies more or less depending on the viewing distance. However, when the distance is longer, the resolution is lowered, and a screen uncomfortable to see is displayed. Accordingly, it is preferable to see a stereoscopic screen of a resolution comfortable to see although the angle of view is as narrow as five viewpoints, rather than an angle of multi-view that can be obtained by 10-viewpoint shooting.

In particular, in the case of watching an image on a small display product such as a cellular phone, the angle of view does not need to be wide since it is observed from the viewpoint of one person at any rate by the nature of the product. As a result, it would be desirable to minimize the optimal perspective viewpoint that can be observed at an optimal resolution.

FIG. 12 is a view showing an example of watching a screen from five viewpoints for each observation viewpoint using a lenticular method in the prior art.

However, no matter how much the resolution is increased within a set resolution and the perspective viewpoint is minimized, when the viewpoints are less than three, watching the screen is dizzy and uncomfortable due to a 'jumping phenomenon' that appears repeatedly even with a slight movement.

The 'jumping phenomenon' is a phenomenon that does not show the screen three-dimensionally at a certain angle although it is shown three-dimensionally according to a viewing angle, and this is a phenomenon that appears at a timepoint when the screen looks dizzy, other than a sequential array that looks three-dimensionally in the array shown on the screen.

As shown in FIGS. 3 and 12, the lenticular method is exemplified as the prior art, and the stereoscopic shooting by the array of general cameras 800 shown in 'FIG. 3' may be configure on the display layer 10 of FIG. 12 as a sequentially repeated array as a result through a 3D dimensioning process performed on the images from 'image No. 1 A1' captured by camera No. 1 to 'image No. 5 A5' captured by camera 5. A transparent thick layer 20 may be disposed on one side of the display layer 10. A lenticular lens array 30 may be disposed on one side of the transparent thick layer 20. The lenticular lens array 30 may be named as a lens array. A plurality of lenses may be arranged in the lenticular lens array 30. A plurality of micro lenses may be arranged in the lenticular lens array 30. The plurality of lenses may be lenses having one convex side. Image No. 1 A1 to image No. 5 A5 may be sequentially arranged to match the lenses constituting the lenticular lens array 30.

The captured images are repeatedly displayed as pixel images of regular intervals according to the resolution (lpi) condition of the display. As a result, it is possible to see (observe) the displayed images through the lenticular lens array 30 or a parallax barrier 40.

As shown in FIG. 12, the position of the perspective observation point viewed through the left and right eyes is divided into viewpoint 1 to viewpoint 5. The positions seen three-dimensionally are viewpoint 1 (images 1 and 2), viewpoint 2 (images 2 and 3), viewpoint 3 (images 3 and 4), and viewpoint 4 (images 4 and 5) according to the viewing angle, and viewpoint 5 (images 5 and 1) at the following angular position observes a screen that looks dizzy. The reason is that when images No. 5 and 1 are seen through the left and right eyes, the human brain cannot accept the two images that do not match three-dimensionally, and feels dizzy.

In addition, a stable stereoscopic screen may be seen at the angles of following perspective view positions of viewpoint 1 (images 1 and 2), viewpoint 2 (images 2 and 3), viewpoint 3 (images 3 and 4), and viewpoint 4 (images 4 and 5). As a result, it appears as a problem in which a phenomenon occurring at a point where it looks three-dimensionally and then dizzy according to the perspective view position, i.e., the 'jumping phenomenon', is generated repeatedly.

Accordingly, in the present invention, the above problems can be solved as shown in FIGS. 13 and 14.

A portable stereoscopic image capturing system according to the present invention may include a control module for 3D dimensioning an image captured by a portable stereoscopic image capturing camera. The control module may convert 5-viewpoint images (five moving images) captured during the interlacing process into images of six or more viewpoints. The control module may produce an image that does not look dizzy by performing interlacing to include an alpha image 15 'α' or (and) 'β' in the images 1, 2, 3, 4, and 5 captured by the lenses A1, A2, A3, A4, and A5.

Referring to FIG. 13, the control module may arrange a stereoscopic image on the display layer 10. A transparent thick layer 20 may be disposed on one side of the display layer 10. A lenticular lens array 30 may be disposed on one side of the transparent thick layer 20. The lenticular lens array 30 may be named as a lens array. A plurality of lenses may be arranged in the lenticular lens array 30. A plurality of micro lenses may be arranged in the lenticular lens array 30. The plurality of lenses may be lenses having one convex side. The control module may arrange the lenses constituting the lenticular lens array 30 to match the stereoscopic image. More specifically, when an image produced by including an alpha image 15 'α' or (and) 'β' in the images 1, 2, 3, 4, and 5 captured by the lenses A1, A2, A3, A4, and A5 and interlacing the images is defined as one image set, the control module may match one image set to one lens of the lenticular lens array 30.

The alpha image 15 is a third general image that is not three-dimensionally seen. This can be generated using a monochrome image, a color image, a gradation image, or other pictures, or a copy image of a captured image, i.e., 'image No. 1' or 'image No. 5', may be repeated to be used as the alpha image 15. Therefore, it is a method of arranging the alpha image and the captured image in order so that the left eye or the right eye may see the image.

For example, as shown in the drawing, when viewpoints are classified according to the perspective angle to observe, an array of seven viewpoints is created in order of viewpoint 1 (α and 1), viewpoint 2 (1 and 2), viewpoint 3 (2 and 3), viewpoint 4 (3 and 4), viewpoint 5 (4 and 5), viewpoint 6 (5 and β), and viewpoint 7 (α and β), and in the case where the alpha image 15 is white (or a black or monochrome image), 'α' or 'β' is seen to be overlapped with the captured image No. 1 or 5 only when it is seen from 'viewpoint 1' and 'viewpoint 6'. That is, as the left and right eyes see the captured image and the white image to be overlapped with each other, as a result, an image that is gradually getting brighter and less dizzy is seen.

The reason is that when the right eye sees image 'No. 1' and the left eye sees image 'a', it will feel like a process of changing the subject screen to white, and as a result, although a white image is seen instantaneously, it does not look dizzy.

In addition, since it is recognized that the stereoscopic screen is completely changed to a white screen at viewpoint 7 (α and β) that is seen immediately thereafter, the white screen is instinctively perceived as a boundary surface (boundary angle of view) when a person sees it. Accordingly, the person will try to move himself or herself to 'viewpoints 2 to 5' where he or she can see well three-dimensionally, i.e., to the center where he or she can see the best three-dimensionally, through the instinctive learning experience, and will instinctively try to move the cellular phone screen or the like held in the hand to the 'position where he or she can see well three-dimensionally' to see the screen. As a result, the 'alpha image 15' functions as an important criterion for unconscious self-correction of the perspective angle of view by the instinctive behavioral dynamics that a human has.

Therefore, as shown in FIGS. 13 and 14, when it is designed to be interlaced by applying the alpha image 15, and the sequence of seeing the screen is organized as follows in an order of viewpoint 1 recognizing α&1=blurred white screen,
viewpoint 2 recognizing 1&2=stereoscopic screen,
viewpoint 3 recognizing 2&3=stereoscopic screen,
viewpoint 4 recognizing 3&4=stereoscopic screen,
viewpoint 5 recognizing 4&5=stereoscopic screen,
viewpoint 6 recognizing 5&β=blurred white screen,
viewpoint 7 recognizing α&β=white screen,
viewpoint 1 recognizing α&1=blurred white screen,
viewpoint 2 recognizing 1&2=stereoscopic screen, and
viewpoint 3 recognizing 2&3=stereoscopic screen, and
this is repeated thereafter.

Figure 15:
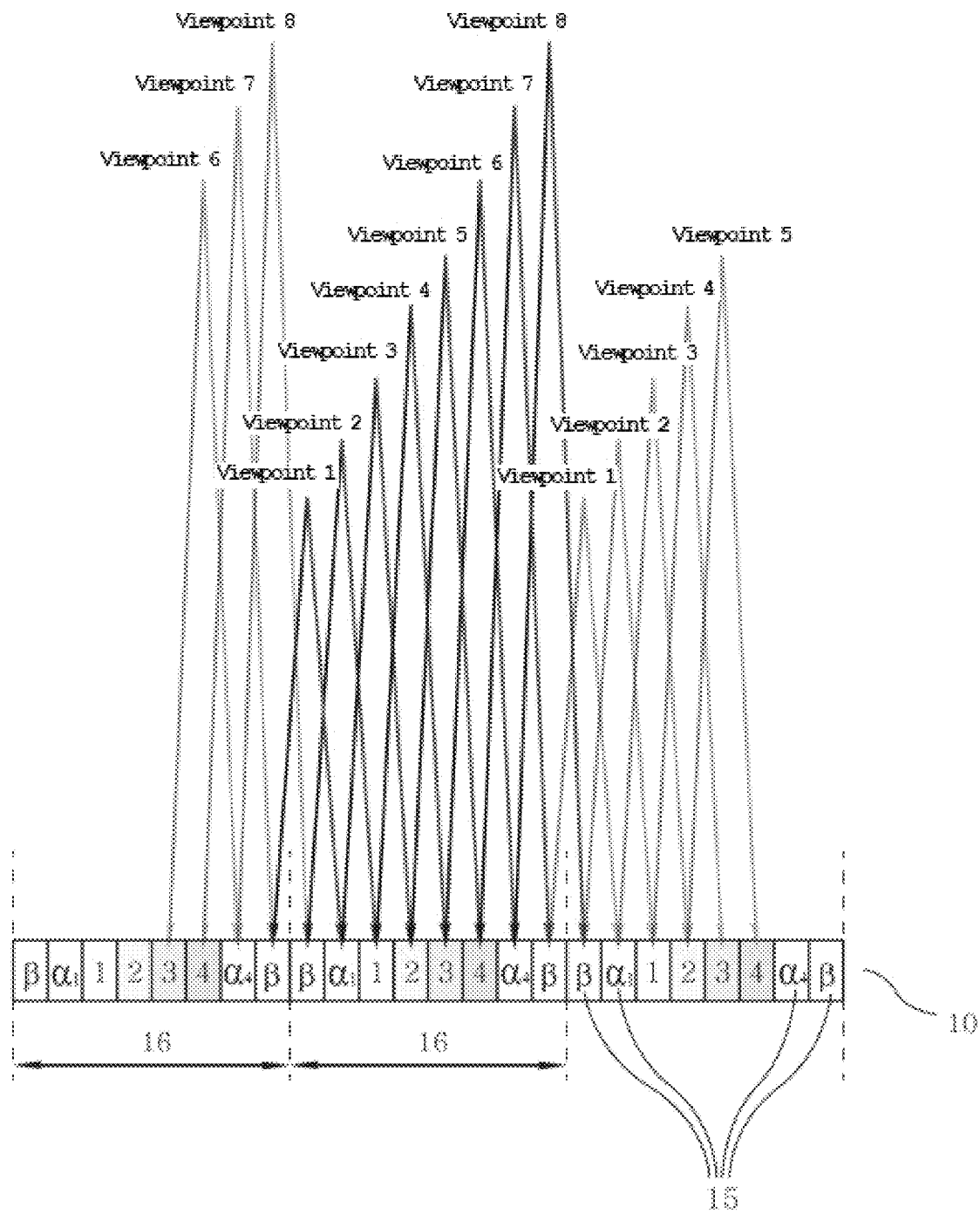
FIG. 15 is a view showing a case in which the perspective angle of seeing a display with the naked left and right eyes is a short distance according to one embodiment of the present invention.

In addition, as shown in FIG. 15, a case in which the perspective angle of seeing the display with the naked left and right eyes is a short distance, particularly, a case of seeing the display from a distance around 30 Cm like a cellular phone will be described according to an embodiment.

That is, a display array structure of a total of eight viewpoints configured of four images (1,2,3,4) captured by four lenses, two monochromatic images β, and two copy images α1&α4 as the alpha image 15 is exemplified.

This will be seen in an order of viewpoint 1 recognizing β&α1=white and copy of image No. 1=blurred white, viewpoint 2 recognizing β&1=white and image No. 1=blurred white, viewpoint 3 recognizing α1&2=copy of image No. 1 and image No. 2=stereoscopic screen, viewpoint 4 recognizing 1&3=image No. 1 and image No. 3=stereoscopic screen, viewpoint 5 recognizing 2&4=image No. 2 and image No. 4=stereoscopic screen, viewpoint 6 recognizing 3&α4=image No. 3 and copy of image No. 4=blurred white screen, viewpoint 7 recognizing 4&β=copy of image No. 4 and white=blurred white screen, viewpoint 8 recognizing α4&β=copy of image No. 4 and white=blurred white screen, viewpoint 1 recognizing β&α1=white and copy of image No. 1=blurred white, and viewpoint 2 recognizing β&1=white and image No. 1=blurred white, and this is repeated thereafter.

Accordingly, this is a method of securing four reliable viewpoints and angles of view that can observe a stereoscopic object without dizziness even when an image is captured using a small number of lenses according to a combination of arranging the alpha images.

In addition, according to the intention of the user, there may be a case where only one alpha image 15, i.e., 'α', is used, and since an array of six viewpoints of perspective position can be made in order of α&1, 1&2, 2&3, 3&4, 4&5, and 5&α, the arranging method can be sufficiently applied.

Therefore, although an array of at least three or more lenses is used, this can be a method that removes the disadvantage of seeing the screen with disgusting dizziness that occurs in the conventional lenticular or parallax barrier method, and application of the alpha image 15 is an innovative method for the stereoscopic image capturing camera of the present invention to provide a wider perspective angle of view and improve the data transmission and interlacing processing speed although a minimum number of lenses are used.

In addition, according to the present invention, interlacing is performed by including the alpha image 15 together with a stereoscopic image, and as a result thereof, the stereoscopic image data produced can be stored or transmitted, and the data can be reproduced.

FIG. 14 is a view showing a method of seeing a stereoscopic image through a display 10 and a parallax barrier 40 according to an embodiment of the present invention.

The data processing and display method is implemented in the same manner as the structure of the lenticular lens array 30 of FIG. 12, except that a parallax barrier 40 film is used instead of the lenticular lens array 30.

As a generalized technique, the parallax barrier method, unlike the lenticular lens array, is a method of three-dimensionally showing an image by making perspective angles of both eyes different by blocking light of a light source and transmitting the light to the display on the rear side, and it is implemented to be sensitive to the pixel size of the display.

The parallax barrier 40 film is divided into a mask 41 portion that blocks light and a slit portion 42 that transmits light, and is manufactured at pitch intervals 16 of a repeated pattern. The size of the slit 42 through which light is transmitted is mainly determined to be around the 'width' size of one display pixel, and since it is general that the area of the mask 41 increases as the number of shooting viewpoints that desire to observe increases, the area of the slit 42 decreases relatively. Accordingly, it generates an adverse effect of darkening the entire screen.

For example, as shown in FIG. 14, when the display pixel array includes a, 1, 2, 3, 4, 5, 13, and is configured of a repeating pattern of a 7-screen configuration, the size of the slit 42 is $1/7$ of the size of the interlaced screen pitch 16, and the mask portion where light is blocked is made in a size of $6/7$. Therefore, a phenomenon in which the screen appears relatively darker than that of the transparent lenticular lens array of FIG. 13 occurs.

When a multi-view image is produced by ten or more viewpoints, as the visibility is lowered due to the display getting dark and or the loss increases due to excessive power consumption, rather than the benefit obtained by widely using the observer's perspective angle of view, the stereoscopic screen will lead to a dark view.

Accordingly, when a case of seeing with a tool such as a small personal display or a cellular phone screen is considered, it is preferable to use three to six viewpoints for the images captured by the lenses, and produce an image with a total of ten viewpoints or less, including at least one alpha image 15.

Although the technical spirits of the present invention have been described above together with the accompanying drawings, this is an embodiment of the present invention described as an example and is not intended to limit the present invention, and it is obvious that anyone skilled in the art can make various modifications and imitations without departing from the scope of the technical spirits of the present invention, and such modifications and imitations fall within the scope of the technical spirits of the present invention.

DESCRIPTION OF SYMBOLS f: Projection distance to subject (arc array)
f2: Projection distance to close subject (arc array)
n: Projection distance of horizontal array lens to subject
p: Interval of lens array
r: Focusing point (radius) of arc array
r2: Focusing point (radius) of arc array in short distance
θ: Projection angle of lens (or rotation value of lens)
A1: Image No. 1 captured by camera No. 1
A2: Image No. 2 captured by camera No. 2
A3: Image No. 3 captured by camera No. 3
A4: Image No. 4 captured by camera No. 4
A5: Image No. 5 captured by camera No. 5
1: Stereoscopic image capturing camera and system
10: Pixel array of display
15: Alpha image (α, β)
16: Interlacing pattern pitch
20: Transparent thick layer
30: Lenticular (lens array)
35: Lenticular lens pitch
36: Parallax barrier pattern pitch
40: Parallax barrier film
41: Mask
42: Slit
43: Slit width size 101: Front side case of camera
102: Rear side case of camera
120: Display 200: Micro lens
201: Wide-angle lens
202: Standard lens
203: Telephoto lens
210: Projection intersection point
211: Subject
240: First reference line
250: Second reference line (center line)
300: Gear module
305: Worm gear
310: Lens holder
311: Lens (holder) rotation axis
320: Rotation axis
321: Small gear
322: Large gear
400: Electronic circuit board
420: Distance sensor
500: Rotating body (motor)
511: Linear saw teeth
510: Linear movement power body
700: Cellular phone
710: Cellular phone display screen
800: General camera

What is claimed is:

1. A portable stereoscopic image capturing camera comprising:
a case including an opening;
a plurality of lenses disposed in a line at a first interval within the case; and
a driving module for rotating each of the lenses, wherein the driving module includes a rotating body combined with the lens to rotate the lens, and rotates each of the lenses toward a subject to form a projection intersection point, and a rotation angle of the lens satisfies the following equation;

$$\theta=[\arctan(X/f)]*180/\pi \qquad \text{<Equation>}$$

(In the above equation, θ denotes the rotation angle of the lens, X denotes a distance to the lens from a second reference line extended from a center position of the plurality of lenses toward the subject, and f denotes a distance from the projection intersection point to a first reference line connecting the plurality of lenses while the plurality of lenses is aligned in a forward direction).

2. The camera according to claim 1, wherein the case includes an upper case having an opening, a lower case in which a display is disposed, and a substrate on which the plurality of lenses is disposed.

3. The camera according to claim 2, comprising a distance sensor disposed on the substrate at a center of an array where the plurality of lenses is disposed to detect a distance to the subject.

4. The camera according to claim 1, wherein the rotating body includes at least one among a motor, a voice coil motor (VCM), an encoder, and a piezoelectric motor.

5. A stereoscopic image capturing system comprising:
a control module for interlacing an image input from a portable stereoscopic image capturing camera; and
a display layer on which the interlaced image is arranged, wherein
the portable stereoscopic image capturing camera includes a plurality of lenses disposed in a line at a first interval, and a driving module for rotating each of the lenses toward a subject to form a projection intersection point, wherein
the control module repeatedly arranges a set of captured images, in which the images captured by the plurality of lenses are sequentially arranged, on the display layer, and each set of the captured images includes an alpha image disposed on at least one of both ends.

6. A system according to claim 5, further comprising:
a transparent thick layer disposed on one side of the display layer; and
a lenticular lens array disposed on one side of the transparent thick layer and including a lens array having a plurality of micro lenses.

7. The system according to claim 6, wherein the alpha image is one among a monochromatic image, a color image, a gradation image, an image captured by a lens disposed at one end among the plurality of lenses, and an image captured by a lens disposed at the other end among the plurality of lenses.

8. The system according to claim 7, wherein the control module arranges the captured image set to match the micro lenses of the lenticular lens array.

9. The system according to claim 5, wherein the alpha image is one among a monochromatic image, a color image, a gradation image, an image captured by a lens disposed at one end among the plurality of lenses, and an image captured by a lens disposed at the other end among the plurality of lenses.

10. A stereoscopic image capturing system comprising:
a control module for interlacing an image input from a portable stereoscopic image capturing camera;
a display layer on which the interlaced image is arranged;
a transparent thick layer disposed on one side of the display layer; and
a parallax barrier film disposed on one side of the transparent thick layer and including a mask part that blocks light and a slit part that transmits light, wherein
the portable stereoscopic image capturing camera includes a plurality of lenses disposed in a line at a first interval, and a driving module for rotating each of the lenses toward a subject to form a projection intersection point, wherein
the control module repeatedly arranges a set of captured images, in which the images captured by the plurality of lenses are sequentially arranged, on the display layer, and each set of the captured images includes an alpha image disposed on at least one of both ends.

11. The system according to claim 10, wherein the alpha image is one among a monochromatic image, a color image, a gradation image, an image captured by a lens disposed at one end among the plurality of lenses, and an image captured by a lens disposed at the other end among the plurality of lenses.

12. The system according to claim 10, wherein the control module arranges the captured image set to match the slits of the parallax barrier film.

* * * * *